US011223408B2

(12) United States Patent
Chapman et al.

(10) Patent No.: US 11,223,408 B2
(45) Date of Patent: Jan. 11, 2022

(54) NETWORK NODE AND METHOD THEREIN FOR DETERMINING A BEAM TO BE TRANSMITTED FOR AT LEAST A FIRST USER EQUIPMENT

(71) Applicant: Telefonaktiebolaget LM Ericsson (publ), Stockholm (SE)

(72) Inventors: Thomas Chapman, Solna (SE); Torbjörn Elfström, Fjärås (SE); Farshid Ghasemzadeh, Sollentuna (SE); Esther Sienkiewicz, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 156 days.

(21) Appl. No.: 16/334,816

(22) PCT Filed: Sep. 23, 2016

(86) PCT No.: PCT/SE2016/050899
§ 371 (c)(1),
(2) Date: Mar. 20, 2019

(87) PCT Pub. No.: WO2018/056876
PCT Pub. Date: Mar. 29, 2018

(65) Prior Publication Data
US 2020/0021349 A1  Jan. 16, 2020

(51) Int. Cl.
*H04B 7/06* (2006.01)
*H04W 52/36* (2009.01)
(Continued)

(52) U.S. Cl.
CPC ........... *H04B 7/0695* (2013.01); *H01Q 3/22* (2013.01); *H01Q 3/26* (2013.01); *H04B 7/043* (2013.01);
(Continued)

(58) Field of Classification Search
CPC .... H04B 7/0695; H04B 17/102; H04B 7/043; H04B 7/0617; H04B 1/3838; H01Q 3/22; H01Q 3/26; H01Q 1/245; H04W 52/367
See application file for complete search history.

(56) References Cited

U.S. PATENT DOCUMENTS 9,680,559 B1 *  6/2017  Freedman ............ H04B 7/1851
2005/0007273 A1 *  1/2005  Fowell ..................... H01Q 3/26
                                                          342/359
(Continued)

OTHER PUBLICATIONS

3GPP, "3rd Generation Partnership Project; Technical Specification Group Radio Access Network; Active Antenna System (AAS) Base Station (BS) transmission and reception (Release 13)", 3GPP TS 37.105 V13.0.0, Mar. 2016, pp. 1-68.
(Continued)

*Primary Examiner* — Hoang-Chuong Q Vu
(74) *Attorney, Agent, or Firm* — Sage Patent Group

(57) ABSTRACT

A method performed by a network node for determining a beam to be transmitted to at least a first User Equipment, UE is provided. The network node determines (903) a beam to be transmitted to at least a first UE based on an obtained average spatial profile of radiated power in each direction. The average spatial profile of radiated power is based on an spatial profile of radiated power averaged over any one or more out of a frequency interval and a time interval.

20 Claims, 19 Drawing Sheets

901. Establish a spatial profile of radiated power in each of different directions.

902. Obtain an average spatial profile of radiated power in each direction by averaging the established spatial profile of radiated powers in each of the respective directions over any one or more out of: a frequency interval and/or a time interval.

903. Determine a beam to be transmitted to at least the first UE 121, based on an obtained average spatial profile of radiated power in each direction.

904. Transmit the determined beam to at least the first UE 121

(51) Int. Cl.
*H04B 17/10* (2015.01)
*H01Q 3/26* (2006.01)
*H01Q 3/22* (2006.01)
*H04B 7/0426* (2017.01)

(52) U.S. Cl.
CPC ......... *H04B 7/0617* (2013.01); *H04B 17/102* (2015.01); *H04W 52/367* (2013.01)

(56) References Cited

U.S. PATENT DOCUMENTS

| | | | | |
|---|---|---|---|---|
| 2006/0270434 A1* | 11/2006 | Lacono | ................ | H04B 7/0604 455/522 |
| 2007/0046539 A1* | 3/2007 | Mani | ................... | H04B 7/0691 342/383 |
| 2009/0196203 A1* | 8/2009 | Taira | ................... | H04B 7/0617 370/280 |
| 2010/0029222 A1* | 2/2010 | Doubchak | ........... | H04B 7/0617 455/101 |
| 2013/0044029 A1* | 2/2013 | Yang | .................. | H04B 7/0671 342/373 |
| 2014/0077997 A1* | 3/2014 | Vermani | ................. | H01Q 3/26 342/374 |
| 2014/0307654 A1* | 10/2014 | Kim | .................... | H04B 7/0647 370/329 |
| 2015/0270885 A1* | 9/2015 | Chang | ................. | H04B 7/0626 375/267 |
| 2016/0302202 A1* | 10/2016 | Lyu | ................... | H04W 72/0446 |
| 2018/0205590 A1* | 7/2018 | Murakami | ......... | H04L 27/2692 |
| 2018/0235008 A1* | 8/2018 | Park | ........................ | H04B 7/06 |

OTHER PUBLICATIONS

Unknown, Author, "47 CFR Ch. I, sec 2.1093", Federal Communications Commission, (Oct. 1, 2010 Edition), pp. 650-651.

Unknown, Author, "Guidelines for Limiting Exposure To Time-Varying Electric, Magnetic, and Electromagnetic Fields (Up To 300 GHz)", International Commission on Non-Ionizing Radiation Protection, ICNIRP Guidelines, Manuscript received Oct. 2, 1997; accepted Nov. 17, 1997, Apr. 1998, pp. 494-522.

Unknown, Author, "Recommended Practice for Coexistence of Broadband Wireless Access Systems", IEEE 802.16.2-00/01r9, Oct. 6, 2000, pp. 1-104.

Unknown, Author, "White Space Devices (WSD); Wireless Access Systems operating in the 470 MHz to 790 MHz frequency band; Part <x>: Harmonized EN covering the essential requirements of article 3.2 of the R&TTE Directive BNSDOCIO: <", Draft EN 301 598 V<0.0.10>, Nov. 2012, pp. 1-53.

European Office Action issued in corresponding EP Application No. 16778904.9 dated Jan. 22, 2020, 05 Pages.

* cited by examiner

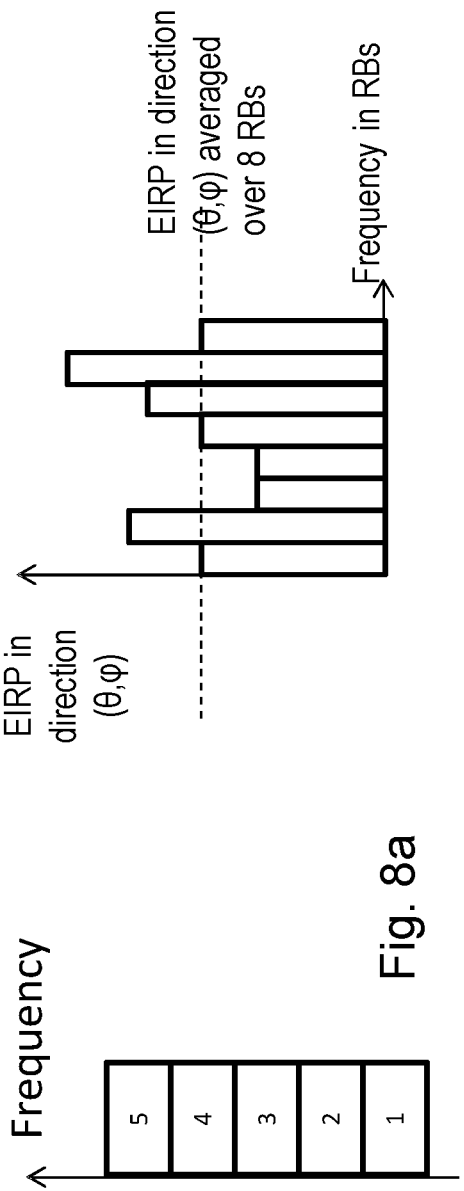
Fig. 8a
Fig. 8b
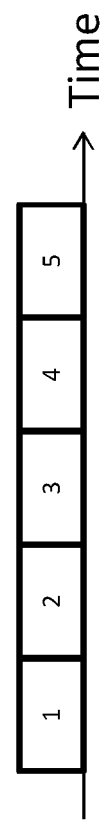
Fig. 8c

NETWORK NODE AND METHOD THEREIN FOR DETERMINING A BEAM TO BE TRANSMITTED FOR AT LEAST A FIRST USER EQUIPMENT

TECHNICAL FIELD

Embodiments herein relate to a network node and a method therein. In particular, they relate to determining a beam to be transmitted for at least a first User Equipment (UE).

BACKGROUND

In a typical wireless communication network UEs, also known as wireless communication devices, mobile stations, and/or Stations (STAs), communicate via a Radio Access Network (RAN) to one or more core networks (CN). The RAN covers a geographical area, which is divided into service areas, or cell areas, which may also be referred to as a beam or a beam group. Each service area or cell area is served by a base station, which may also be referred to as a radio network node, a radio access node, a Wi-Fi access point, a Radio Base Station (RBS), a NodeB (NB) or eNodeB (eNB). A service area or cell area is a geographical area where radio coverage is provided by the radio network node. The base station communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using Wideband Code Division Multiple Access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. Multi-antenna techniques can significantly increase the data rates and reliability of a wireless communication network. The performance is in particular improved if both the transmitter and the receiver are equipped with multiple antennas, which results in a Multiple-Input Multiple-Output (MIMO) communication channel. Such systems and/or related techniques are commonly referred to as MIMO.

Future access technologies are expected to support a large amount of transmit antennas, and especially on the network side. In the context of Massive MIMO, as an example, the number of antennas is expected to be huge, where a single transmission point may have in the order of several hundreds or even thousands of antenna elements. A large, albeit much smaller, number of antennas may potentially be expected also in the UE at the high carrier frequencies, since the physical size of the antenna elements at those frequencies may be made very small.

For the LTE standard, 3GPP has introduced the Channel State Information (CSI)-Reference Signals (RS) for CSI acquisition for up to 8 antenna ports, in see e.g. in Release 11, 3GPP 36.211 and 36.213 for CSI reporting procedures. Further, up to 16 antenna ports see e.g. in 3GPP Release 13 and in the coming 3GPP Release 14 up to 32 ports 8 antenna ports. This enables UEs to evaluate a channel between the eNB and the UE for up to 8 independent channels on the eNB side. The UE evaluates the channel and reports CSI.

This increased number of antenna elements, makes it possible to form more directive antenna patterns as compared to what is possible with the older antenna systems of today. The more capable system can focus its transmitted and/or received signal much more efficiently towards the UE being served, whilst suppressing the interference from/to other UEs. Each transmit direction towards a UE is typically referred to as a beam, whereas the entire process of focusing energy towards a UE being served is referred to as beam forming.

Active Antenna Systems (AAS) are an important part of LTE evolution and an essential part of 5G.

AAS is a generic term that is often used to describe radio base stations that incorporate a large number of separate transmitters that can be used for MIMO and beamforming, and integrate active transmitter components and radiating elements. There are several advantages to AAS implementation. One is that the integrated design reduces loss factors and can reduce overall power consumption. Secondly, form factor, i.e. size and weight may be reduced. Related to this, there is some potential for site simplification. For LTE, AAS base stations may offer beamforming functionality, such as cell splitting, variable down tilt and user specific beamforming. In 3GPP, a number of air interface enhancements have been specified including the possibility of up to 16 CSI-RS ports and CSI-RS beamforming to facilitate the exploitation of AAS base stations.

It is envisaged that a 5G air interface design, also referred to as NX, and 5G may operate in higher frequency bands than today. For example, 4 GHz is discussed for first systems in Japan, whilst World Radio Conference 2015 (WRC 15) may allocate spectrum up to 6 GHz. Further into the future, it is envisaged that International Telecommunications Union (ITU) and/or regional regulators may allocate millimeter wave spectrum in in the range 10-100 GHz. Radio waves in this band have wavelengths from ten to one millimeter, giving it the name millimeter band or millimeter wave, also referred to as MMW or mmW.

At higher frequencies, propagation losses are much greater than in today's bands. Furthermore, it is envisaged that transmissions will take place within higher bandwidths. Since the transmit power of both base stations and devices is limited by physical constraints and considerations such as Maximum allowed Electromagnetic Field strength (EMF), it is not possible to compensate the increased penetration losses and provide sufficient Signal to Interference and Noise Ratio (SINR) within wider bandwidths simply with increased transmit power. In order to achieve the link budgets required for high data rates, beamforming will be necessary. It is therefore expected that integrated active arrays will become a mainstream base station building practice in the 5G era.

In general, to comply with Radio Frequency (RF) EMF exposure limits, AAS base stations will be installed so that access to the compliance boundary is prevented. The compliance boundary of a base station is described as a volume around the transmitting antenna aperture outside which the exposure level is below a specified limit. The compliance boundary of current macro base stations may extend several meters in the main beam direction. In FIG. 1, the maximum Equivalent Isotropic Radiated Power (EIRP) is plotted as function of compliance distance with respect to the International Commission on Non-Ionizing Radiation Protection (ICNIRP) and the Federal Communications Commission (FCC) limits.

Some methods to reduce transmitting peak power exist already today. The methods may comprise selection of modulation and coding schemes to limit the amount of peak clipping that needs to be performed, or other smart algorithms to reduce the peak power at the output of the transceiver. However, the solutions available do not consider the spatial domain. For an AAS base station, it is very likely that more beamforming capabilities will be part of the design.

In order to achieve beamforming, an AAS base station will possess a number of logical components as illustrated in FIG. 2. FIG. 2 illustrates an example of an AAS architecture. The base station comprises and Antenna Array (AA), a Radio Distribution Network (RDN), a Transceiver Unit Array (TXRUA) and a Baseband processing. The baseband processing may be used to perform user specific Transmit (TX) and Receive (RX) beamforming. Although a logical part of the base station, the baseband processing may not be physically co-located with the other components. The TXRUA comprises active circuits that may perform actions such as signal conditioning, amplification and filtering in transmit and receive. There may be a different number of transmitters to receivers and the transmitters and receivers may be implemented as single modules or separately. The RDN distributes TX signals between the TXRUA and the transmit antenna elements and RX signals between receive antenna elements and the TXRUA. The RDN may comprise splitting and combining of signals. The antenna array comprises a group of radiating elements, i.e. single antennas. The radiating elements may be TX only, or RX only, or both RX and TX.

Beamforming is performed by applying amplitude and/or phase variations to the signals radiated from different antenna elements. The amplitude and phase variations may be applied at any stage in the architecture of FIG. 2. Typically, for very dynamic and/or user specific beamforming, the amplitude and phase weights are set in the baseband.

A very common type of array, known as a uniform linear array is shown in FIG. 3. The depicted array comprises a set of antenna elements arranged in one dimension with a uniform spacing.

It is possible for the depicted uniform linear array to transmit beams at different angles with respect to the antenna plane, as depicted in FIG. 4. FIG. 4 illustrates an example of different beams steered from a uniform linear array.

A simple means to direct a beam is to apply a so-called linear phase progression, calculated as follows:

$$w_n = e^{-j\frac{2\pi z_n \cos(\vartheta_c)}{\lambda}}$$

for n=1..N
Where:
n is an index into the antennas,
Zn is the position of the $n^{th}$ antenna along the z axis in the coordinates system,
Wn are the phase weights applied at each of the N antennas,
$\lambda$ is the wavelength, and
$\vartheta_c$ is the beam steering direction, More complex types of array include 2D linear arrays, arrays with non-uniform antenna spacing in a single plane and conformal arrays, in which antenna elements are arranged in three dimensions.

The 3GPP specifications include a number of methods for generating precoding weights. A commonly used method is codebook based precoding, in which a standardized codebook consists of sets of beamforming weights. Each codebook entry comprises a set of weights that can generate a beam. One of the codebook entries is selected, according to feedback from the UE. Transmissions modes 4, 5, 6, 9 and 10 use codebook based precoding, see 3GPP 36.213.

Alternatively, transmission modes 7, 8 and 9 include a UE specific demodulation reference signal that is precoded along with the symbols carrying data. This enables the base station to select precoding weights in any manner without the need for any codebook. An example of a means for selecting weights is reciprocity based precoding in Time Division Duplex (TDD), in which knowledge of the TDD channel based on uplink measurements is used to derive downlink precoding weights.

An AAS array may typically use methods such as those described above to direct beams in different directions at different times. A beam is directed towards a particular UE or group of UEs when the UE is scheduled. By directing energy using beamforming, received signal power to the scheduled UE may be increased whilst interference towards other UEs is decreased.

An interesting parameter relating to array is a spatial profile of directed radiated power such as the so-called Equivalent Isotropic Radiated Power (EIRP). In radio communication systems, EIRP or, alternatively, equivalent isotropically radiated power is the amount of power that a theoretical isotropic antenna, which evenly distributes power in all directions, would emit to produce the peak power density observed in the direction of maximum antenna gain. EIRP can take into account the losses in transmission line and connectors and includes the gain of the antenna. The EIRP is often stated in terms of decibels over a reference power emitted by an isotropic radiator with an equivalent signal strength. The EIRP allows comparisons between different emitters regardless of type, size or form.

From the EIRP, and with knowledge of a real antenna's gain, it is possible to calculate real power and field strength values.

EIRP is associated with a direction in relation to the base station. EIRP is the amount of power that would need to be input to an ideal, isotropic antenna in order to experience the same amount of field strength in the direction under consideration as is experienced from the actual antenna. If the actual antenna array has directivity, then in reality a lower power will need to be provided to the antenna than needs to be provided to an isotropic antenna.

A particularly important value of EIRP is the EIRP in the direction of the main lobe of the transmitted signal. FIG. 5 depicts a simplified example of a beam EIRP profile with direction in one dimension.

Regulators typically specify a maximum amount of power that may be transmitted by a base station. The maximum power level may be driven by interference or health considerations. The maximum power may be a conducted level, that is, it may be the sum of the power output of each transmitter unit in the transceiver unit array of FIG. 2. However, regulators may also place a restriction on peak EIRP from the base station.

The purpose of applying UE specific beamforming is to increase the EIRP in the direction of the scheduled user, in order to increase SINR and achieve higher data rates. However, a restriction on the maximum EIRP will limit the amount of beamforming gain that can be achieved. In the worst case, the EIRP limit may limit the range and data rate supportable by the base station.

E.g., a base station vendor may declare that a certain set of beams can be transmitted with a declared rated maximum EIRP per beam. For example, it may be that a base station can transmit a group of cell specific beams for one or more cells with a declared EIRP level. Furthermore, the specification such as e.g. 3GPP, service provider, manufacturer or operator, may allow for a tolerance interval around the declared EIRP value. For example, a tolerance of +−2 dB around the declared EIRP may be allowable. For example, the current value in the 3GPP 37.105 specification is now 2.2 dB.

However, it may be a problem when the allowed tolerance around the declared EIRP is exceeded. If the power should fall below the lower end of the tolerance range or rise above the upper end of the tolerance range then the base station would no longer be compliance with the specified requirement, and may also breach health and/or interference limits.

SUMMARY

It is therefore an object of embodiments herein to further improve the performance of a wireless communications network.

According to a first aspect of embodiments herein, the object is achieved by a method performed by a network node for determining a beam to be transmitted to at least a first User Equipment, UE.

The network node determines a beam to be transmitted to at least a first UE based on an obtained average spatial profile of radiated power in each direction. The average spatial profile of radiated power is based on a spatial profile of radiated power averaged over any one or more out of a frequency interval and a time interval.

According to a second aspect of embodiments herein, the object is achieved by a network node for determining a beam to be transmitted to at least a first User Equipment, UE. The network node is configured to determine a beam to be transmitted to at least a first UE, based on an obtained average spatial profile of radiated power in each direction, in which the average spatial profile of radiated power is based on an spatial profile of radiated power averaged over any one or more out of a frequency interval and a time interval.

Since the average spatial profile of radiated power is taken into account when a beam for a UE is determined, the average power over time e.g. considered by a regulator may be reduced. This in turn results in that the performance of the wireless communications network is further improved.

BRIEF DESCRIPTION OF THE DRAWINGS

Examples of embodiments herein are described in more detail with reference to attached drawings in which:

FIG. 8a is a schematic diagram of a spatial profile of EIRP averaged over frequency.
FIG. 8b is a schematic diagram illustrating an example embodiment related to a frequency domain.
FIG. 8c is a schematic diagram of a spatial profile of EIRP averaged over time.

DETAILED DESCRIPTION

As part of developing embodiments herein, the inventors realized some problems that first will be discussed.

As mentioned above, regulators may place a restriction on peak radiated power, such as EIRP, which will be used as a specific example of radiated power in many of the described embodiments below, from the base station due to e.g. health considerations. Typically, such a restriction is a limitation of the radiated power in a certain direction, which is often calculated as an average of radiated power in a certain direction over a frequency interval or a time interval. However, when using beams this limit of average radiated power in a certain direction may decrease the gain of beamforming. Therefore, it is desirable to be able to transmit a beam in a certain direction without exceeding the limit of average radiated power in said direction.

A solution to the above stated problem may be achieved by calculating the average radiated power in a certain direction over either frequency or time, and rescheduling the beam at a different frequency or at a different point in time since the average would otherwise exceed the limit, wherein the limit may be seen as a threshold. This allows a base station to achieve high beamforming gains while avoiding exceeding the threshold.

In addition, as mentioned above, a base station manufacturer or service provider may declare that a certain set of beams may be transmitted with a declared rated maximum radiated power or EIRP per beam. For example, a base station may transmit a group of cell specific beams for one or more cells with a declared average spatial EIRP profile level. Furthermore, a specification e.g. related to a service provider, manufacturer or operator may allow for a tolerance interval around the declared EIRP value. For example, a tolerance of +−2 dB around the declared average spatial EIRP profile may be allowable.

However, it may be a problem when the allowed tolerance around the declared average spatial EIRP profile is exceeded. If the average spatial EIRP profile would rise above a threshold or would fall below the threshold, the base station would not be compliant to requirements. Likewise if the declared average EIRP for the beams would not be kept.

This is since currently, if the average spatial EIRP profile is known and declared accurately, there is no method to adapt the EIRP in beams dependent on inter beam load and traffic conditions whilst keeping the average spatial EIRP profile to the declared value and meeting the tolerance limit. The average special EIRP profile may also be referred to as the average spatial profile of EIRP.

Figure 1:
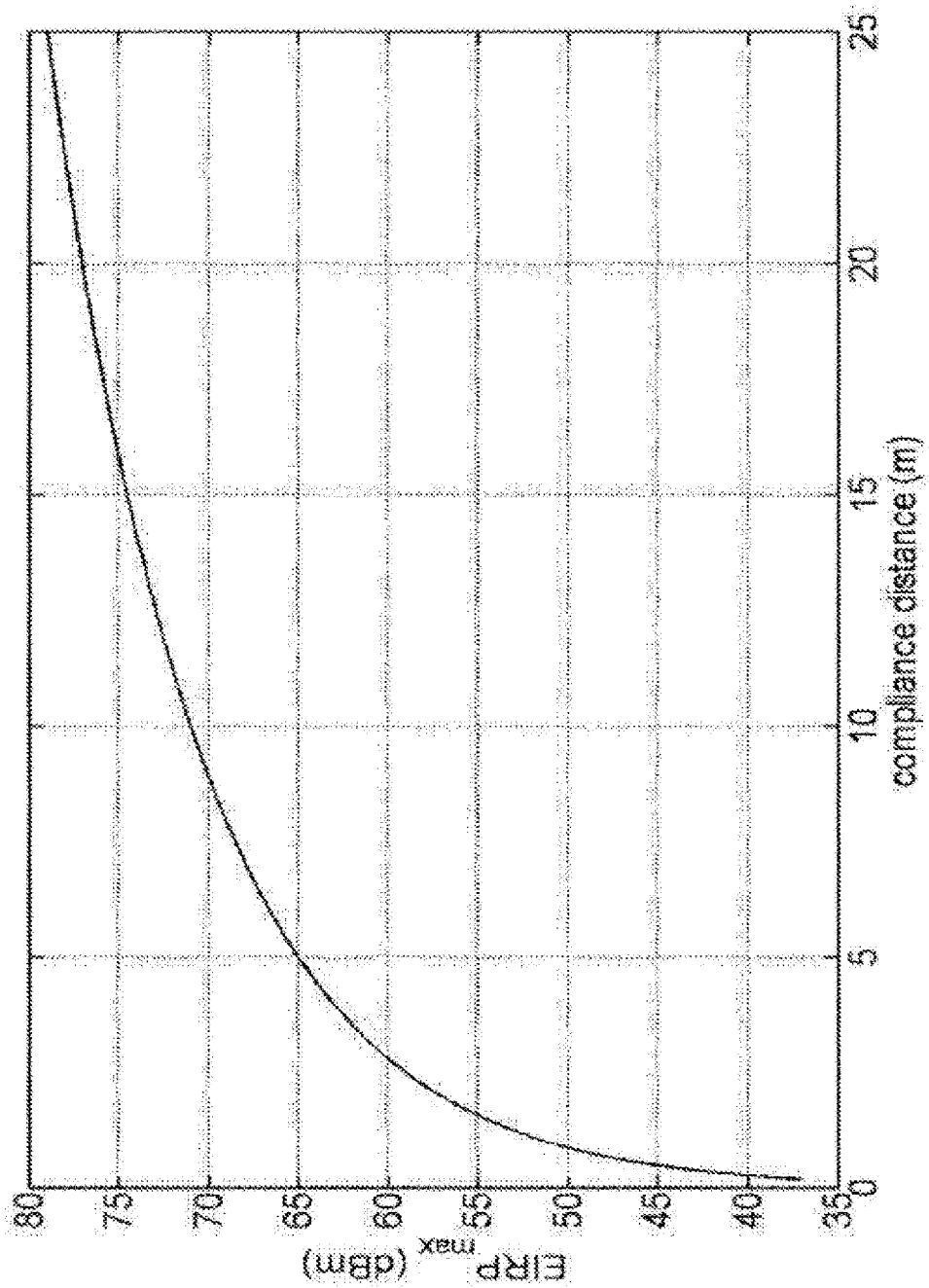
FIG. 1 is a schematic diagram illustrating below a maximum EIRP plotted as function of compliance distance with respect to ICNIRP and FCC limits.
Figure 2:
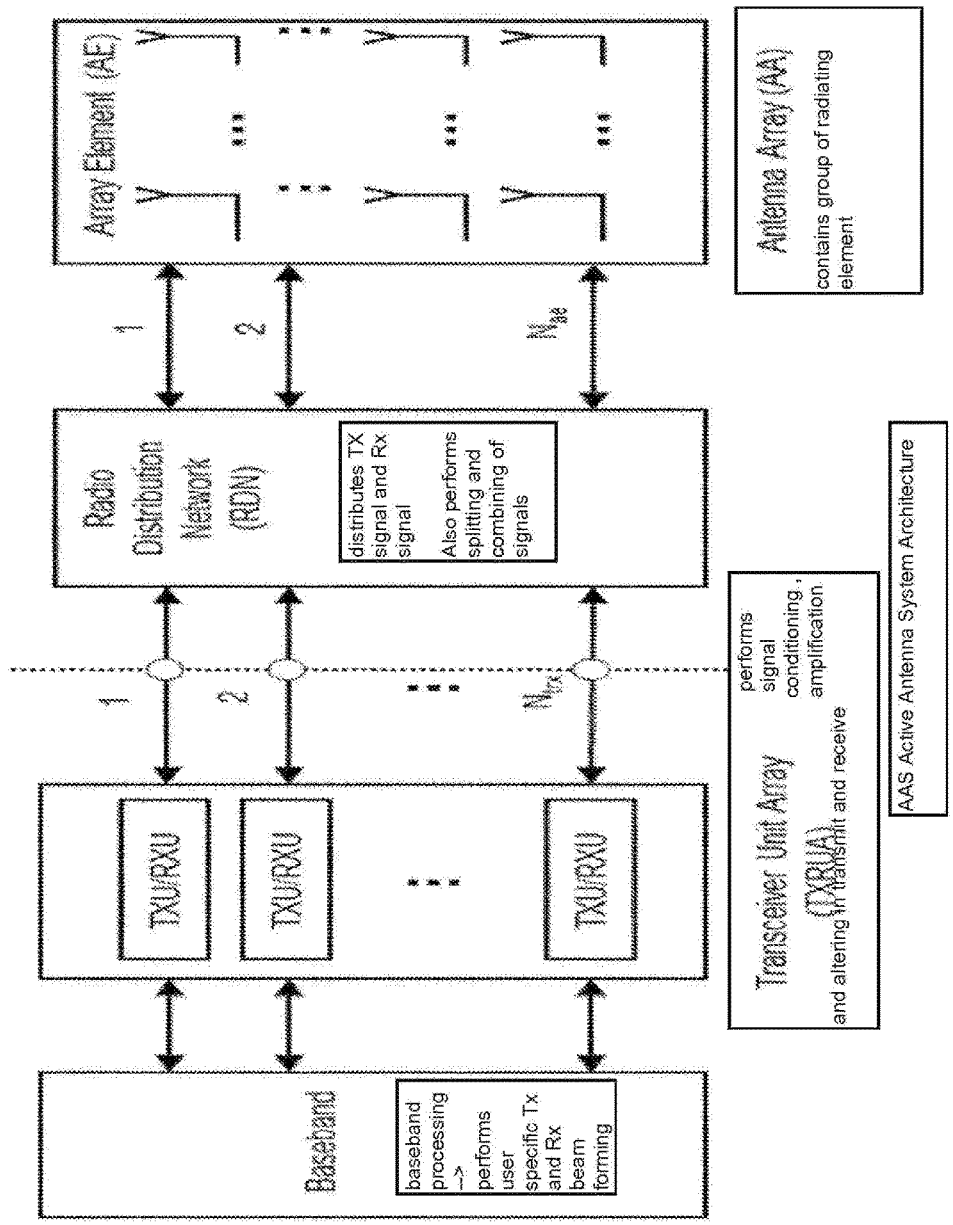
FIG. 2 is a schematic block diagram illustrating prior art.
Figure 3:
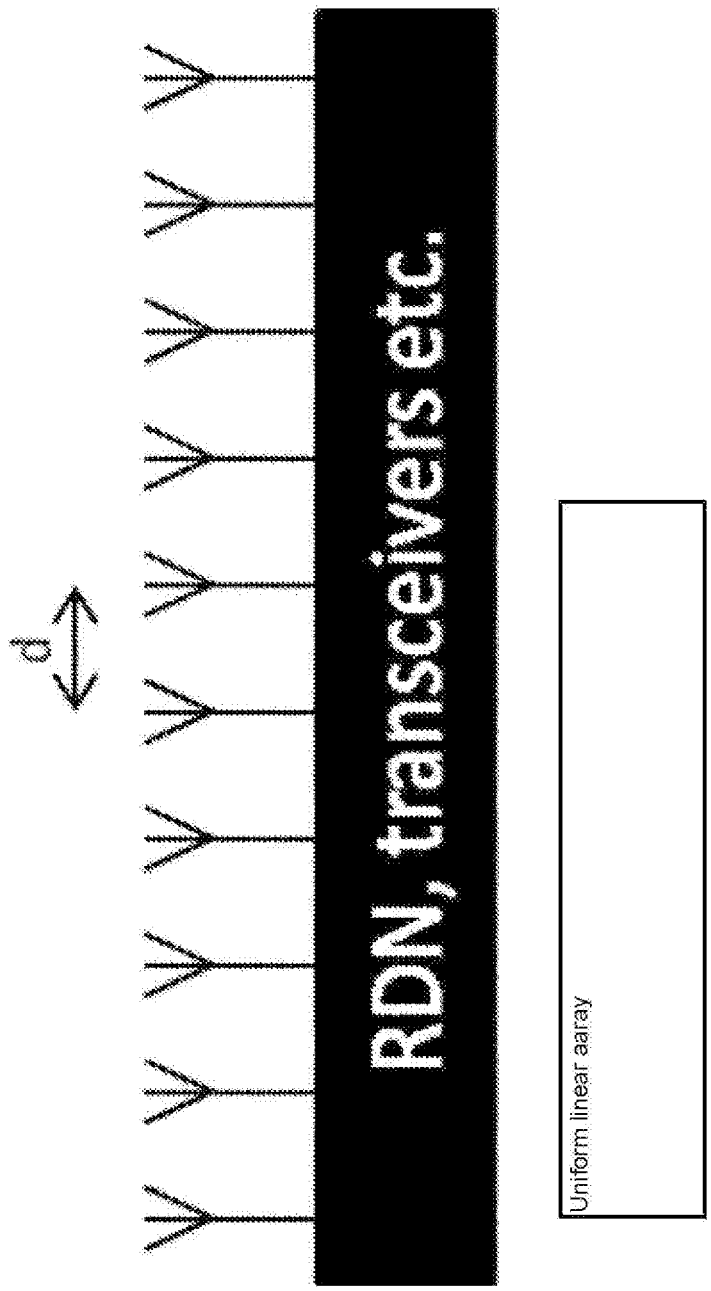
FIG. 3 is a schematic block diagram illustrating prior art.
Figure 4:
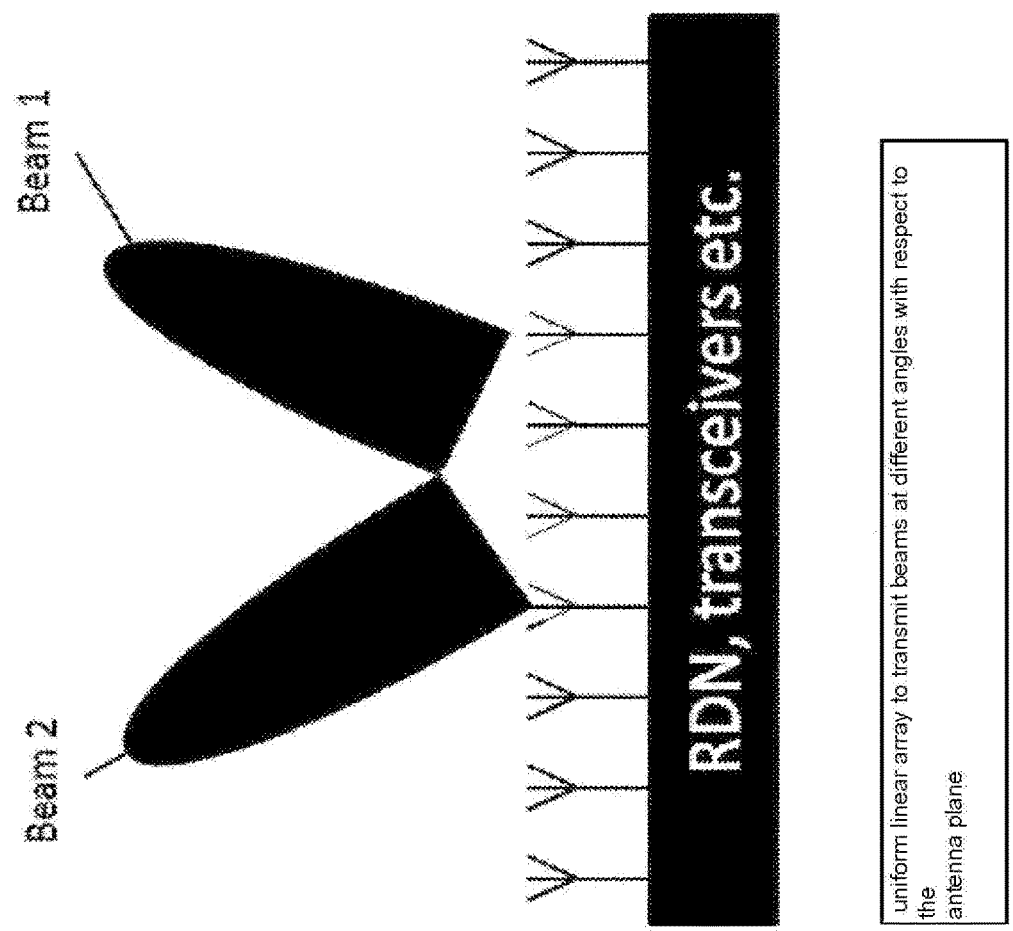
FIG. 4 is a schematic block diagram illustrating prior art.
Figure 5:
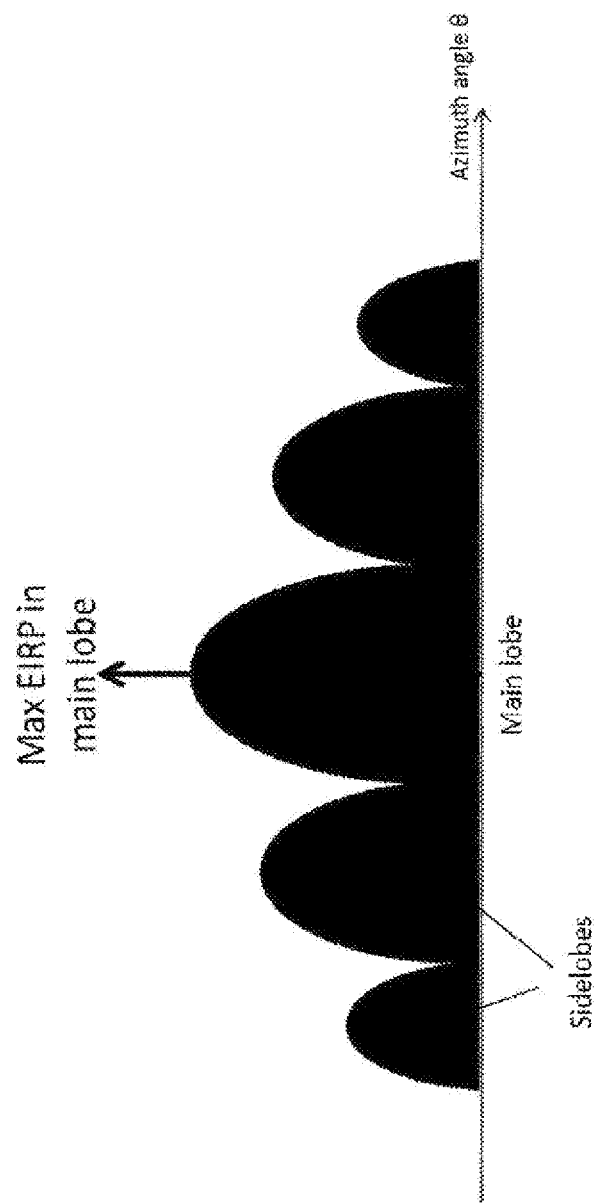
FIG. 5 is a schematic block diagram illustrating prior art.
Figure 6:
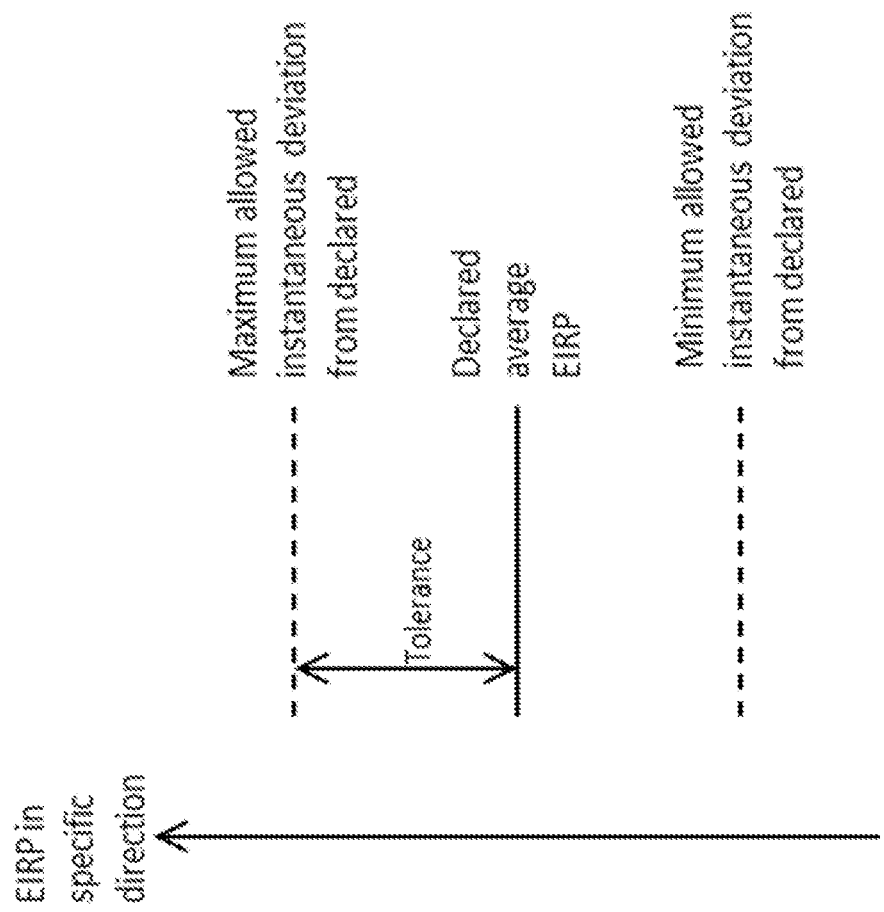
FIG. 6 is a schematic block diagram illustrating a declared tolerance range, according to prior art.

FIG. 6 illustrates an example of a declaration of an average spatial EIRP profile for a beam in a specific beam pointing direction, together with a tolerance range around the declared average spatial EIRP profile within which the instantaneous EIRP must remain. In this figure, as in FIGS. 10,11,12,15,16,17 and 18, the "average EIRP" in the figure text corresponds to an average spatial profile of EIRP.

Example embodiments herein provide a method to adapt the EIRP in beams, e.g. dependent on inter beam load and traffic conditions. This makes it possible to keep the average spatial EIRP profile below a regulated average spatial EIRP profile limit according to some embodiments and to stay within a tolerance range of a declared average spatial EIRP profile meeting a tolerance limit according to some other embodiments.

Embodiments of the method relates to determining a beam to be transmitted for at least a first UE in a wireless communication network, such as for example scheduling beams to meet an EIRP limit.

Some embodiments relate to a network node for performing beamforming to one or more UEs in which the network node calculates the beam pattern it transmits to a UE and keeps track of the average spatial profile of radiated power, such as e.g. the average spatial EIRP profile, in each direction around the base station. The average being over frequency or time. This is such that the network node can determine beams and/or take scheduling decisions to avoid exceeding a threshold for average spatial EIRP profile in any individual direction, or to maintain average spatial EIRP profile at a specific level in certain directions.

Figure 7:
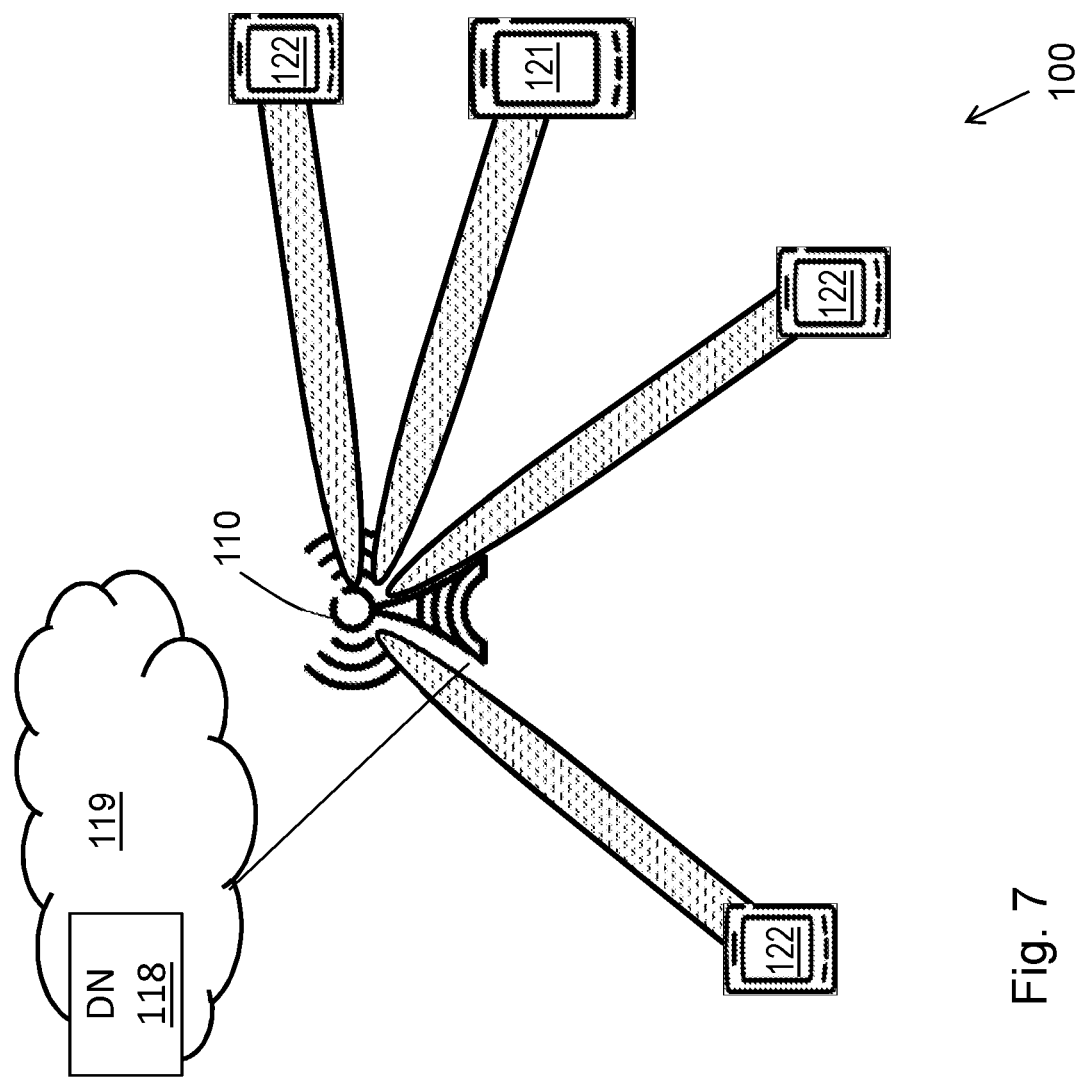
FIG. 7 is a schematic block diagram illustrating embodiments of a communications network.

FIG. 7 is a schematic overview depicting a wireless communication network 100 in which embodiments herein may be implemented. The wireless communication network 100 comprises one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A network node 110 operates in the wireless communication network 100. The network node 110 provides radio coverage over a geographical area, which may also be referred to as providing beams or a beam group of beams. The network node 110 uses a radio access technology (RAT), such as 5G, LTE, Wi-Fi or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a UE within the service area served by the radio network node 110 depending e.g. on the first radio access technology and terminology used. The network node 110 comprises a multiple antenna system, for example an AAS array and may be referred to as an AAS node.

A number of UEs operate in the wireless communication network 100, such as e.g. one or more first UEs 121 and one or more second UEs 122. The first and second UEs 121, 122 may each be a mobile station, a non-access point (non-AP) STA, a STA, a wireless terminal, communicate via one or more Access Networks (AN), e.g. RAN, to one or more Core Networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within the wireless communications network 100.

A method for or determining a beam to be transmitted to at least the first user UE 121, is performed by the network node 110. As an alternative, a Distributed Node (DN) 118 and functionality, e.g. comprised in a cloud 119 as shown in FIG. 7, may be used for performing or partly performing the method.

Embodiments and implementations will be described in terms of radiated power in a specific direction ($\Theta, \varphi$) such as EIRP, and are exemplified by meeting limits of the radiated power such as a limit of the average spatial EIRP profile in a direction and declarations of average EIPR. However, generally the embodiments herein may be applied where there are other metrics of directional field strength relating to interference or exposure limits.

Regarding the terms used herein:

EIRP is a means of expressing transmit power in a specific direction (⊖,φ). It may be generically used for any direction. It may be referred to as radiated power in a specific direction (⊖,φ).

Where ⊖ is the azimuth angle in relation to the base station, and where φ is the elevation angle in relation to the base station.

Spatial profile of radiated power may e.g. be EIRP(⊖,φ, f=F,t=T); The profile of EIRP for each (⊖,φ) at time T and frequency F. Other metrics of power may be devised such as field strength or relative to a different type of antenna.

A spatial power profile is a function of (⊖,φ) that provides the radiated power in every (⊖,φ) combination, applicable for a specific time and frequency. Thus spatial power profile=power (⊖,φ, t, f).

A Spatial EIRP profile is similar to spatial power profile, but where the power is expressed as EIRP.

Averaged spatial profile of radiated power may also be referred to as the average spatial power profile, and is an average over a time interval and/or a frequency interval of the spatial power profile. E.g. when averaged over time, ASPP=power (theta, phi, f). When averaged over both, ASPP=power(theta,phi).

Averaged spatial profile of radiated power may be described as mean(EIRP(⊖,φ,f=all F,t=T) or EIRP(⊖,φ,f=F, t=all T) or EIRP(⊖,φ,f=all F,t=all T); i.e. EIRP in EIRP(⊖, φ) averaged over either time, or frequency or both.

In a typical multi-user scenario in the wireless communication network 100, the network node 110 may schedule different beams in different beam directions in order to reach different users such as the one or more first UEs 121 and one or more second UEs 122 at different frequency intervals. The network node 110 such as a scheduler in the network node 110 may decide to transmit different beams with different beam directions on different resource blocks. An LTE channel is divided into resource blocks. This implies that over frequency, there may not be a single beam pointed in a single direction. If the EIRP is averaged over frequency in any one direction, the EIRP will be different to the EIRP experienced in any single beam. See FIG. 8a. FIG. 8a depicts frequency divided into resource blocks (1,2,3,4,5). Averaging according to embodiments herein, may involve averaging the EIRP in each RB 1,2,3,4,5. See also FIG. 8b illustrating a spatial profile of EIRP in direction (θ,φ) averaged over 8 RBs.

A similar consideration may apply in the time domain. The network node 110 may schedule different beams in different beam directions in order to reach different users such as the one or more first UEs 121 and one or more second UEs 122 at different points in time. This implies that a beam is not pointed in a single direction continuously. When the radiated power such as e.g. the EIRP is averaged in each beam direction over a period of time, the average spatial EIRP profile will be different to the EIRP experienced during the period of time that a beam is pointed in a particular direction. The advantage is that a beam may be pointed in a particular direction for a period of time with higher power than the allowed average power. This would allow more beamforming gain in order to provide the first UE 121 with a higher data rate. See FIG. 8c. FIG. 8c illustrates time divided into intervals (1,2,3,4,5). Averaging according to embodiments herein, may involve averaging the EIRP in each interval 1,2,3,4,5.

The network node 110 such as the scheduler of the network node 110 may use a direction dependent metric to keep track of the average spatial EIRP profile transmitted in each direction around the network node 110. The average may be the average over time, or the average over frequency, or both.

The method according to embodiments herein takes average spatial profile of radiated power, also referred to as spatial distribution of the radiated power, into account when a beam for a UE is determined, such as e.g. average spatial EIRP profile. This is e.g. to reduce transmission power, or to apply less beamforming.

The information of average spatial profile of radiated power such as e.g. the average spatial EIRP profile may at least be used for two purposes. The first purpose is to ensure that the average radiated power such as e.g. transmitted EIRP, remains below a threshold level for meeting e.g. a regulatory requirement specified in one or more directions. The second purpose is to ensure that the average spatial profile of radiated power, such as the average spatial EIRP profile, remains equal within a tolerance range of, a predetermined profile, at least in certain directions, in order to meet a manufacturer declaration, whilst allowing the radiated power e.g. EIRP for some individual resource blocks or beams to deviate from the profile for certain times or frequencies.

Figure 9:
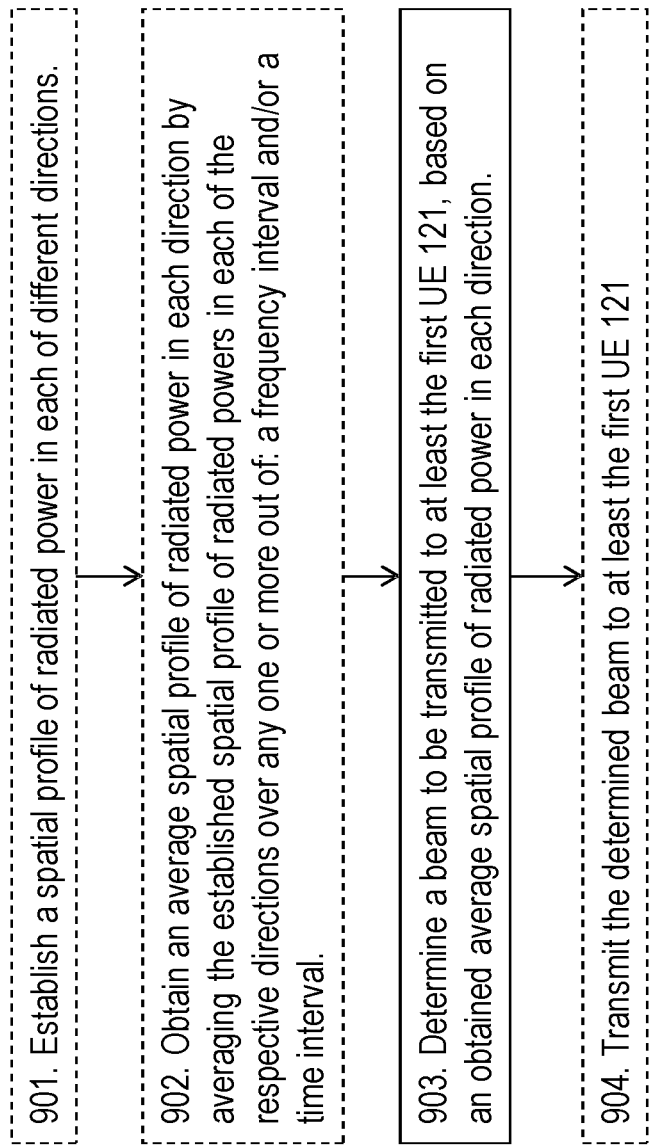
FIG. 9 is a flowchart depicting embodiments of a method in a network node.

Example embodiments of a method performed by the network node 110 for determining a beam to be transmitted to at least the first UE 121 will be described in a general way with reference to a flowchart depicted in FIG. 9. After this a more detailed explanation and exemplification follows.

The method comprises the following actions, which actions may be taken in any suitable order. Actions that are optional are presented in dashed boxes in FIG. 9.

According to an example scenario, a beam is to be transmitted to at least the first UE 121 to enable data transmission between the network node 110 and the at least first UE 121.

Action 901 A spatial profile of radiated power in each of different directions from the network node 110 need to be established, e.g. to be able to determine or schedule a beam so that it does not exceed a regulated limit of average radiated power, such as a regulated threshold, in the direction of the beam during the scheduled frequency and/or time of the beam, or to be able to determine or schedule a beam so that it stays within a tolerance range of a declared average of radiated power in the beam direction. Thus, the network node 110 optionally establishes a spatial profile of radiated power in each of different directions from the network node 110, related to beams transmitted in each of the respective different directions.

According to an example scenario, extra parameters may be added into a scheduling algorithm in the network node 110, such that e.g. a scheduler in the network node 110 may establish, e.g. estimate the radiated EIRP in every direction and direction of maximum EIRP when a beam shall be determined for a UE such as the first UE 121 being scheduled. In order to make this estimation, the network node 110 e.g. the scheduler of the network node 110 may use information about the architecture of its transceiver unit array and RDN and the geometry of the transmitter antenna array.

Information about the architecture of a transceiver unit array and/or RDN of the network node 110 may be needed for the estimation since the spatial pattern of EIRP is directly related to the geometry of the antenna array and the mapping of transceivers to antenna elements. Information about the geometry of the transmitter antenna array may be needed for the estimation since the geometry of the antenna array directly impacts the spatial profile of EIRP.

When the network node 110 has information about its transceiver unit array the antenna array geometry and/or RDN then the network node 110 will be able to establish, e.g. by calculating a spatial profile of radiated power, such as e.g. an EIRP profile, for any beam that is transmitted, whether the beam is based on codebook based precoding or some other method such as reciprocity.

Action 902

The network node 110 may then obtain an average spatial profile of radiated power in each direction by averaging the established spatial profile of radiated powers in each of the respective directions, averaged over any one or more out of: a frequency interval and a time interval. A purpose of averaging may be to establish that a requirement on average spatial EIRP profile set over a defined time or frequency interval is met.

This means that the network node 110 obtains one average spatial profile for each direction, wherein each one of said average spatial profiles are based on radiated power in said direction during different times or different frequencies.

The instantaneous spatial profile at any time and frequency is created by estimating the radiated power, such as EIRP in each direction. The average spatial profile is created by averaging instantaneous spatial profiles over time or frequency.

Action 903

When the network node 110 shall determine the beam for at least the first UE 121 it will take the average spatial profile of radiated power in each direction into account. It is an advantage since to take the average spatial profile of radiated power in in each direction into account will allow for the network node 110 to achieve high beamforming gain whilst not radiating too little or excessive average power in any direction.

The network node 110 thus determines a beam to be transmitted to at least the first UE 121, based on an obtained average spatial profile of radiated power in in each direction. The average spatial profile of radiated power is based on a spatial profile of radiated power averaged over any one or more out of a frequency interval and a time interval. The determined beam may be user specific.

The radiated power in each direction is optionally represented by an EIRP in the direction of the beam. The EIRP is the radiated power in an individual direction. The spatial profile is the set of EIRP in every direction of the beam, including the main lobe direction of the beam.

The average spatial profile of radiated power may include or not include the estimated radiated power spatial profile of the beam to be transmitted to the at least first UE 121. For a prospective beam transmission, the power to be radiated if the beam was to be transmitted is estimated, and the estimated radiated power of the prospective beam is then optionally included in the average profile of radiated power. It depends on the implementation. For some implementations the average spatial profile may include the estimate to ensure that the threshold would not be exceeded if the beam where to be transmitted. In other implementations, it may be that if the threshold is near to being exceeded even without the estimated radiated power, then the beam is not transmitted but may be rescheduled in a different frequency or at a different point in time.

Action 904

The network node 110 may then transmit the determined beam.

The following may e.g. relate to the first purpose ensuring that the average spatial profile of radiated power, such as the average spatial EIRP profile, shall remain below a threshold for meeting e.g. a regulatory requirement.

Thus, in some embodiments, the average spatial profile of radiated power includes the estimated radiated power of the beam to be transmitted to the at least first UE 121. The determining of the beam may be performed such that the average spatial profile of radiated power does not exceed a threshold, wherein the threshold is a regulated limit for the average spatial profile of radiated power in a certain direction at a certain frequency and point in time. Further, the determining of the beam may be performed by adjusting beamforming weights for the beam such that the average spatial profile of radiated power does not exceed a threshold in any direction. E.g. check that threshold is not exceeded in the direction to transmit the beam in and check in any other direction that threshold is not exceeded there.

In some alternative embodiments, the average spatial profile of radiated power does not include the estimated radiated power of the determined beam to be transmitted for the at least first UE 121

The determining of the beam may be performed by determining the beam to be transmitted in a different frequency e.g. a frequency or frequency range (resource blocks) other than for which the obtained spatial profile of radiated power exceeds a threshold in the direction of the beam, when the average spatial profile of radiated power averaged over a frequency interval exceeds a threshold. The average spatial profile of radiated power exceeds the threshold in any direction, in particular the direction of the beam.

As an alternative the determining of the beam is performed by determining the beam to be transmitted at a different point in time, e.g. a time other than that for which the obtained profile of radiated power exceeds a threshold in the direction of the beam, when the average spatial profile of radiated power averaged over a time interval exceeds a threshold.

The threshold mentioned above may be represented by a limit for average radiated power in a direction from the network node.

The following may e.g. relate to the second purpose ensuring that the average spatial profile of radiated power, such as the average spatial EIRP profile, remains essentially equal to a predetermined profile and e.g. within a tolerance range of the declared average spatial EIRP, at least in certain directions, in order to meet a manufacturer declaration, whilst allowing the radiated power e.g. EIRP for some individual resource blocks or beams to deviate from the profile for certain times or frequencies The determining of the beam may further be performed such that any one or more out of: The average spatial profile of radiated power is within a tolerance range of a declared average spatial profile of radiated power, and e.g. within a tolerable instantaneous deviation from a declared average spatial profile of radiated power.

The determining of the beam may comprise determining the beam to have a radiated power that is any one out of increased and decreased, compared to a declared level of available power, as long as the determined beam stays within a tolerance range of the declared spatial profile of radiated power. This will be further explained below.

The determining of the beam may comprise temporarily increasing or decreasing the radiated power in the direction of the beam, such that the average spatial profile of radiated power in the direction of the beam remains within a tolerance range of a declared average spatial profile of radiated power, and such that the average radiated power profile of all the beams in the direction is equal to the declared average spatial profile of radiated power. This will be further explained below.

Embodiment's herein will now be further described and explained. The text below is applicable to and may be combined with any suitable embodiment described above. EIRP is used as an example of radiated power.

First purpose, keeping transmitted EIRP below a threshold level

The application behind the first purpose may be to ensure that regulatory EIRP limits are met. In these examples, the radiated power in each direction is represented by an EIRP in each direction of the beam, but may as well be any kind of average spatial profile of radiated power.

For frequency dependent averaging, the frequency domain is broken into a number of averaging intervals.

Referring to Action 901 in which the network node 110 establishes a spatial profile of radiated power such as EIRP in each of different directions from the network node 110, related to beams transmitted in each of the respective different directions, e.g. related to at least one beam transmitted. This establishing may be performed by a different node, which then informs the network node 110 of the result. The EIRP is established e.g. calculated in each possible direction. The EIRP in a particular direction is calculated for each respective beam that is or will be transmitted to each respective one of the UEs such as e.g. the first UE 121 and the second UEs 122. This is performed in each possible direction considering the beam pointing direction of the beam and e.g. the radiation pattern for the beam to be determined for the UE 121, and applied to the each one of the resource blocks scheduled to the first UE 121. Considering herein means that, to calculate the EIRP in each direction, the calculation will need to take the beam pointing direction and the radiation pattern into account. When the beam pointing direction is aligned with the direction in which the EIRP is calculated, then the EIRP will be high; otherwise the EIRP may be low. This means that the average spatial profile of EIRP may be increased in the direction where the EIRP is high, but decreased in directions where the EIRP is low.

Referring to Action 902 in which the network node 110 obtains an average spatial profile of radiated power e.g. an average spatial EIRP profile in each direction by averaging over a frequency interval, the established spatial profile of radiated powers in each of the respective directions. This obtaining may be performed by a different node, which then informs the network node 110 of the result. In each direction, the average spatial EIRP profile is then calculated in the considered direction across all Resource Blocks (RBs) within the frequency interval to be averaged. FIG. 8a mentioned above is a schematic diagram illustrating a frequency interval such as a frequency domain, broken up in averaging intervals 1, 2, 3, 4, 5, each of them e.g. a 100 kHz averaging interval for the purpose of EIRP averaging. See also FIG. 8b mentioned above illustrating EIRP in direction (θ, φ) averaged over 8 RBs.

Referring to Action 902 in which the network node 110 obtains an average spatial profile of radiated power e.g. an average spatial EIRP profile in each direction, here by averaging over a time interval, the established spatial profile of radiated powers in each of the respective directions. In each direction, the average spatial EIRP profile is then calculated in the considered direction across past, and possible also present Transmission Time Intervals (TTIs) or similar time units to be averaged. FIG. 8c mentioned above is a schematic diagram illustrating a time interval such as a time domain, broken up into averaging time intervals 1, 2, 3, 4, 5 for the purpose of EIRP averaging.

For time dependent averaging, when a beam is scheduled in a particular direction, the average spatial profile of radiated power such as the EIRP is increased. If no beam is scheduled in a particular direction, the average spatial profile of radiated power such as the EIRP decreases. This means that if the EIRP is high in a direction, it will tend to increase the average; if it is low, it will decrease it. The increase or decrease in the average spatial profile of radiated power such as the EIRP in each direction is dependent upon the transmission (TX) power and beam pattern in that direction. The average spatial profile of radiated power such as the EIRP may be increased not only in the beam pointing direction, but also in other directions in which significant energy is radiated by the beam or even potentially in every direction according to the calculated spatial power profile of the beam. The network node 110 can then be configured such that it schedules beams in directions in which the average is low, whilst avoiding directions in which the average is high. In this way, beams may be scheduled with high EIRP whilst the average may be maintained within a threshold or tolerance range.

Figure 10:
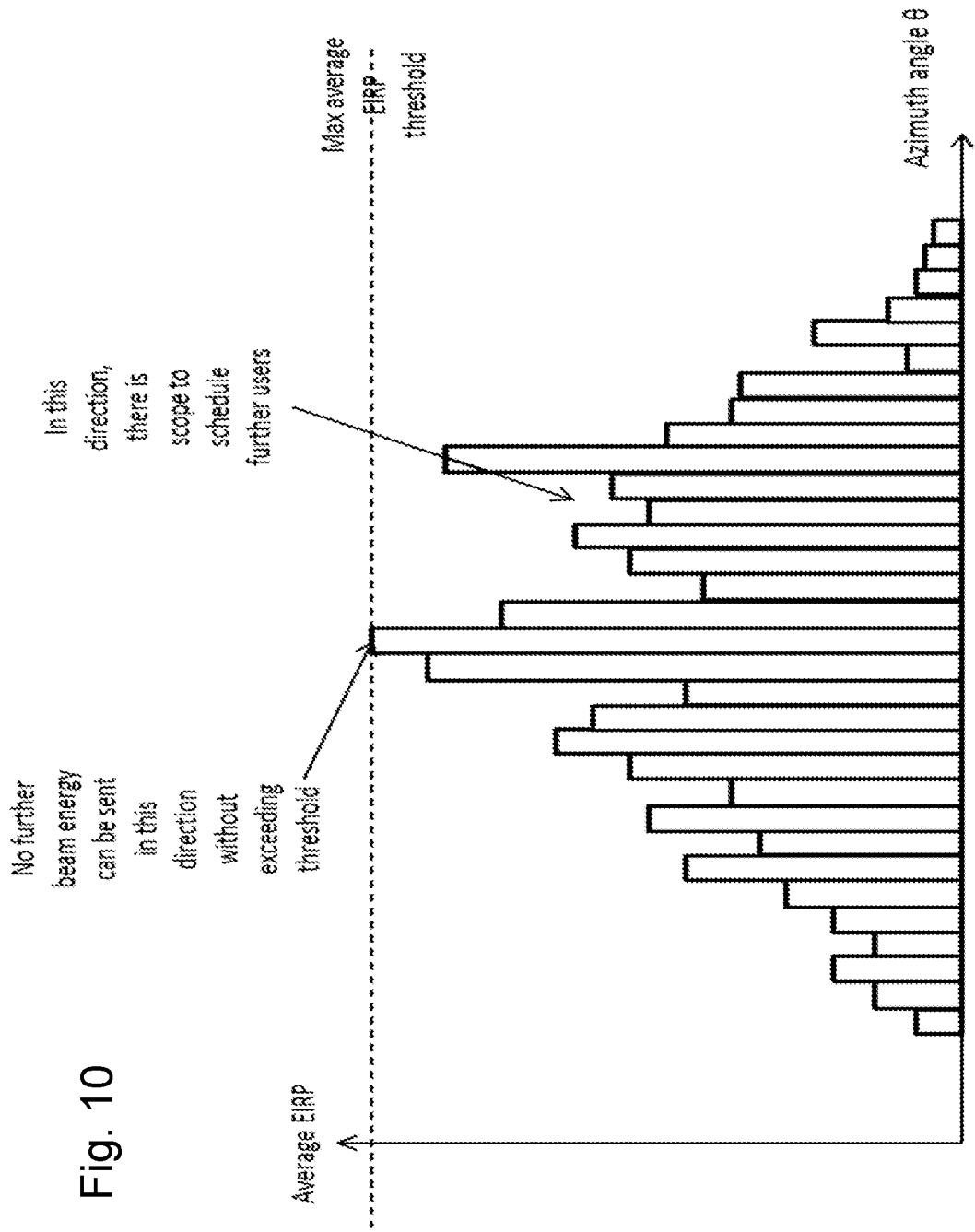
FIG. 10 is a schematic diagram illustrating an example embodiment herein.

FIG. 10 shows an example of a profile of average spatial EIRP with respect to direction in one dimension, wherein the maximal average EIRP threshold is the limit for the maximal average spatial profile of EIRP that is tolerated in a direction according to regulations. For frequency domain averaging, FIG. 10 depicts an average spatial EIRP profile for a particular frequency averaging interval. For time domain averaging, the figure shows a snapshot of average spatial EIRP profile at a particular point in time. For simplicity purposes, the figure considers the average spatial EIRP profile only in one dimension, θ; however if an array can steer in two dimensions then the average spatial EIRP profile would be tracked in both dimensions.

Referring to Action 903 in which the network node 110 determines a beam to be transmitted to at least the first UE 121, based on an obtained average spatial profile of radiated power e.g. the average spatial EIRP profile in each direction. When making scheduling decisions such as determining a beam for the first UE 121, the network node 110, such as e.g. its scheduler, takes into account that the average spatial EIRP profile is not allowed to exceed a certain threshold. By examining the metrics such as the average spatial profile of radiated power e.g. the EIRP in each direction, the network node 110 is able to either (i) avoid scheduling UEs such as the first UE 121 in such a manner that the average spatial EIRP profile threshold would be exceeded, or (ii) adjust the beamforming weights that it will use when scheduling certain users such as the first UE 121 in order to avoid exceeding the EIRP threshold. If the EIRP in a particular direction is close to the maximum, then the network node 110 may avoid transmitting a beam in the affected direction by means of determining the beam either in a different frequency averaging interval or at a different point in time in the future. This may be achieved by means of scheduling different UEs including the first UE 121 to those beams for which transmitting the best beam would lead to exceeding the average spatial EIRP profile limit, e.g. by scheduling different UEs using beams in different directions to the direction in which transmitting the best beam to the first intended UE would lead to exceeding the average spatial EIRP profile limit in any direction. As an alternative, it may be achieved by scheduling the intended users including the first UE 121 but with a less optimal beam direction such that the UEs are still reached but the EIRP threshold is not exceeded.

Second purpose, keeping the average spatial EIRP profile to a prescribed value in certain directions.

The application behind the second purpose may be one in which e.g. a manufacture has declared a certain level of EIRP to be available for certain beams such as cell specific beams, within a tolerance level. In these examples, the radiated power in each direction is represented by an EIRP in each direction of the beam, but may as well be any kind of average spatial profile of radiated power.

Apart from the beams for which the EIRP is and has to be maintained and kept within a tolerance range of the declared average EIRP, and for which beams the average EIRP over time or frequency in a certain direction has to be maintained at the declared average EIRP, other beams are to be determined and scheduled, for example user specific beams.

Figure 11:
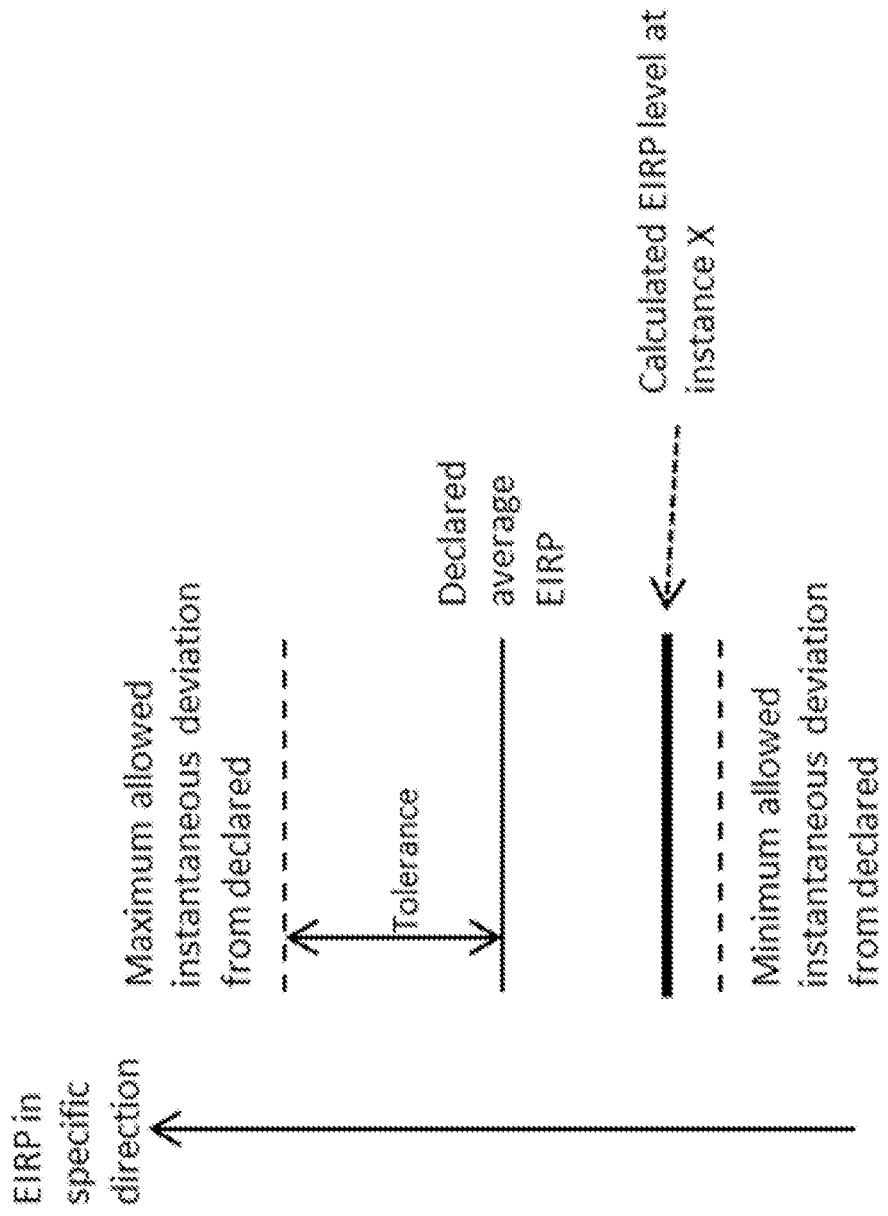
FIG. 11 is a schematic diagram illustrating an example embodiment herein.
Figure 12:
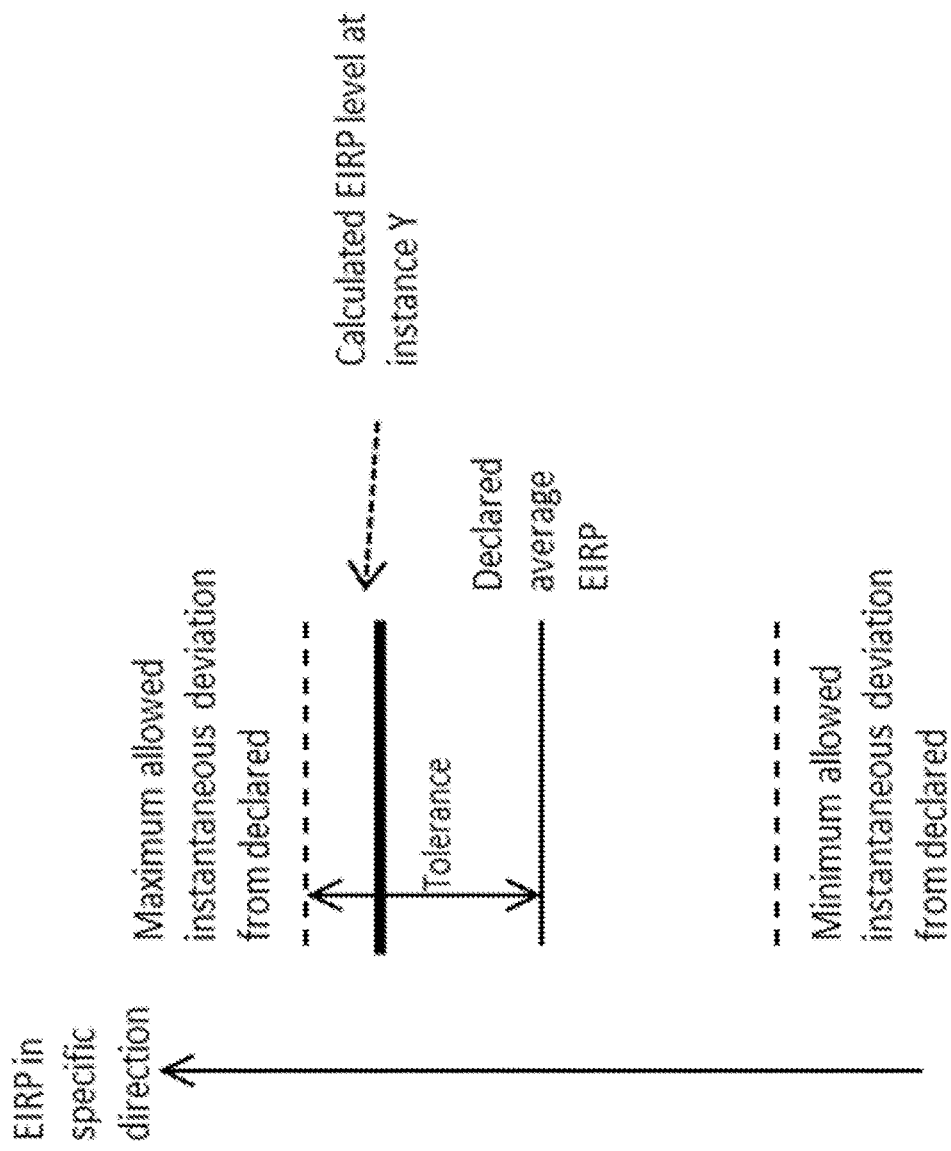
FIG. 12 is a schematic diagram illustrating an example embodiment herein.

From time to time, it may be useful to e.g. temporarily increase the EIRP for the other beams, for example, to increase data rates or reach cell edge UEs In order to provide power for these beams, resources such as may be reduced for the beams for which EIRP is maintained. Resources that may be reduced include power and transmitters. The reduction in EIRP as a result of the reduced resources may be any amount such that the EIRP remains within the tolerance range of the declared average. FIG. 11 is a schematic diagram illustrating an example of deliberately deciding to transmit with an instantaneous EIRP (at instance X) in a specific direction below the declared average EIRP profile value but within the tolerance range, such as when determining the beam to be transmitted to at least the first UE 121. It may be that the EIRP is instantaneously outside of the tolerance range. However, the average remains within the tolerance range. In some embodiments it may be that the average EIRP profile value is remaining at the declared value and the instantaneous EIRP within a tolerance range as a further alternative In order to keep the average spatial EIRP profile to the declared level, at other times the EIRP provided to the beams may be boosted by means of increasing the amount of resources available for the beams. See FIG. 12, illustrating an example of deliberately deciding to transmit with an EIRP at instance Y in a specific direction above the declared value but within the tolerance range, such as when determining the beam to be transmitted to at least the first UE 121. Instantaneously it may be out of the tolerance range, but the average shall stay within the range.

This means that in some embodiments, the average should remain within a tolerance range, and the instantaneous may be anything. However in some alternative embodiments the average is remaining at the declaration and the instantaneous is within a tolerance range.

The embodiments relating to the first purpose, i.e. keeping the transmitted average EIRP profile below a threshold level, allow for the network node 110 to achieve high beamforming gain whilst avoiding exceeding average spatial EIRP profile thresholds. This will allow for user specific beamforming to be exploited such that better coverage and higher data rates are obtained.

The benefits of the embodiments relating to the first purpose, i.e. keeping transmitted average EIRP below a threshold level, are dependent upon regulatory EIRP limits being defined as an average spatial EIRP profile rather than an instantaneous EIRP. Currently regulatory limits specify a frequency averaging interval for EIRP, and thus frequency averaging is most applicable. At this point in time, regulators typically do not consider time average spatial EIRP profile, however this is because regulators have based current requirements on passive antenna systems and not beamforming systems for which beam patterns may vary dynamically. When addressing AAS, 5G and beamforming systems, consideration may well be given to defining of a measurement time period for EIRP.

The embodiments relating to the second purpose, i.e. keeping the average spatial EIRP profile to a prescribed value in certain directions provide a means for a manufacturer to keep EIRP for certain beams to a declared average level and within a tolerance range whilst temporarily re-assigning resources to other beams. This enables a better utilization of power and transmitter resources, which can in turn reduce base station size, energy consumption and cost.

Figure 13:
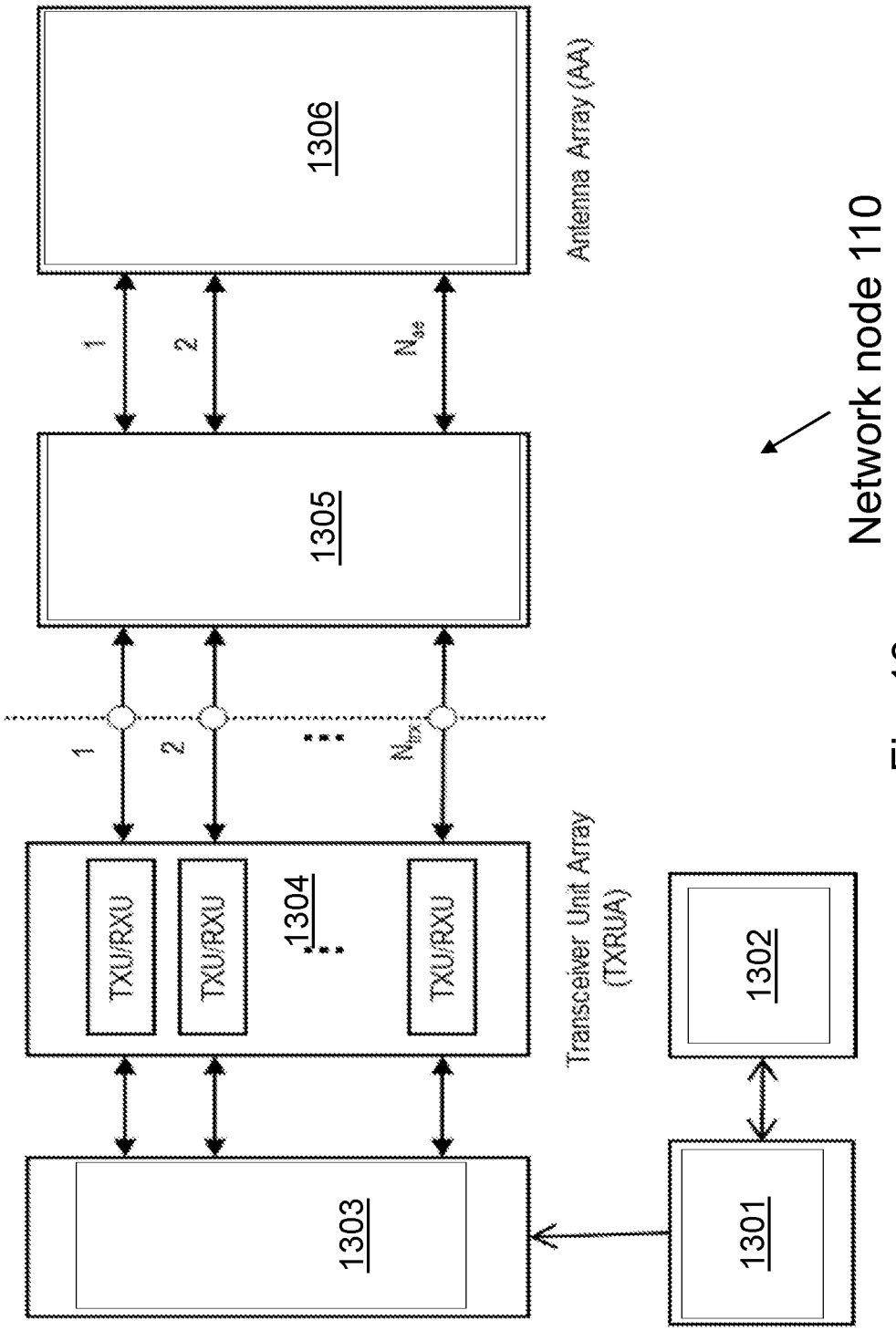
FIG. 13 is a schematic block diagram illustrating embodiments of a network node.

An example of the network node 110 for performing the method herein is illustrated in the schematic block diagram of FIG. 13. The network node 110 comprises a scheduler 1301, a beam intensity calculation unit 1302, a baseband 1303, a transceiver unit array 1304, an RDN 1305, an antenna array 1306 and other hardware and software components responsible for management of the network node 110 and transportation of data to and from the network node 110 over backhaul. In this example, the RDN maps transmitters to TX antenna elements using a 1:1 mapping, and there are 32 transmitters and antenna elements. Other configurations of RDN and array are also possible. A scheduler algorithm may also be included in the network node 110. The scheduler algorithm collects typical parameters, such as data buffer size, reports of CQI and CSI, QoS information etc. from a UE such as the first UE 121 and second UEs122. According to embodiments herein, the scheduler 1301 may also receive information on the average spatial profile of radiated power such as e.g. the average spatial EIRP profile in each of a set of spatial directions around the network node 110 e.g. from the beam intensity calculation unit 1302. Optionally, assistance information from scheduled UEs such as the first UE 121 and possibly the second UEs122, may also be used for calculating the average spatial profile of radiated power such as e.g. the average EIRP.

Figure 14:
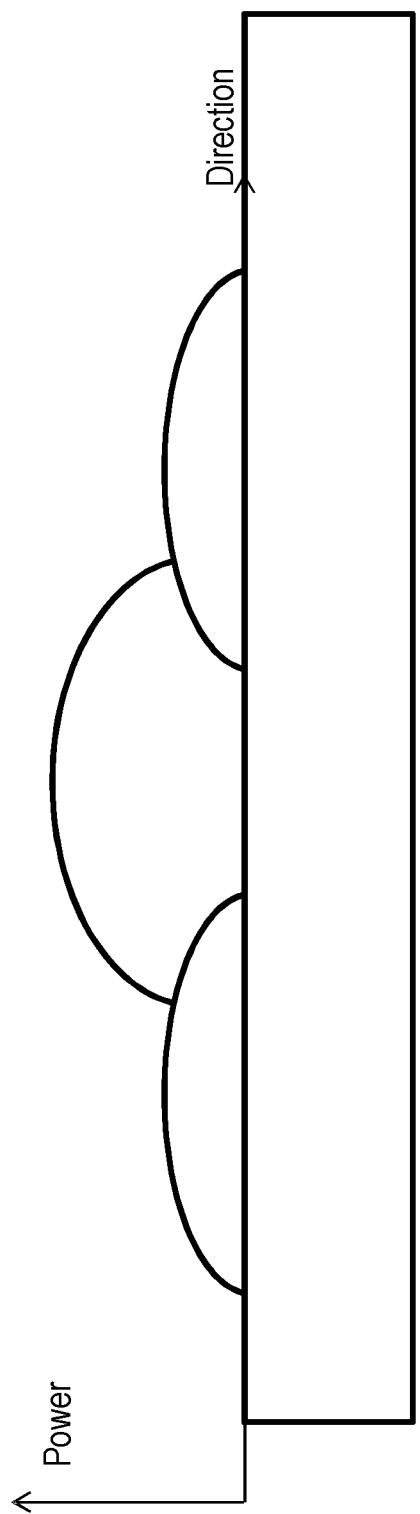
FIG. 14 is a schematic diagram illustrating an example embodiment herein.

The beam intensity calculation unit 1302 estimates the spatial profile of radiated power such as e.g. the EIRP in each direction in space if a particular beam is scheduled such as the determined beam for the first UE 121. An example of a beam intensity pattern is provided in FIG. 14.

Furthermore, the beam intensity calculation unit 1302 may maintain a record of the average spatial profile of radiated power such as e.g. the average spatial EIRP profile in each spatial direction. An example calculation of the average spatial EIRP profile ($EIRP_{av}$) is shown in the equation below.

$EIRP_{av}(\theta, t) = 0.8 * EIRP_{av}(\theta, t-1) + (1-0.8) EIRP(\theta, t)$

Where:

$EIRP_{av}(\theta, t)$ is the average spatial EIRP profile in direction $\theta$ at time t, and $EIRP(\theta, t)$ is the EIRP of the scheduled beam in direction $\theta$ at time t.

0.8 is a factor that controls the time duration of the averaging.

Two example embodiments are described below relating to the first purpose, keeping transmitted EIRP below a threshold level. In these examples and all examples below, the radiated power is represented by an EIRP, but may as well be any kind of average spatial profile of radiated power.

Figure 15:
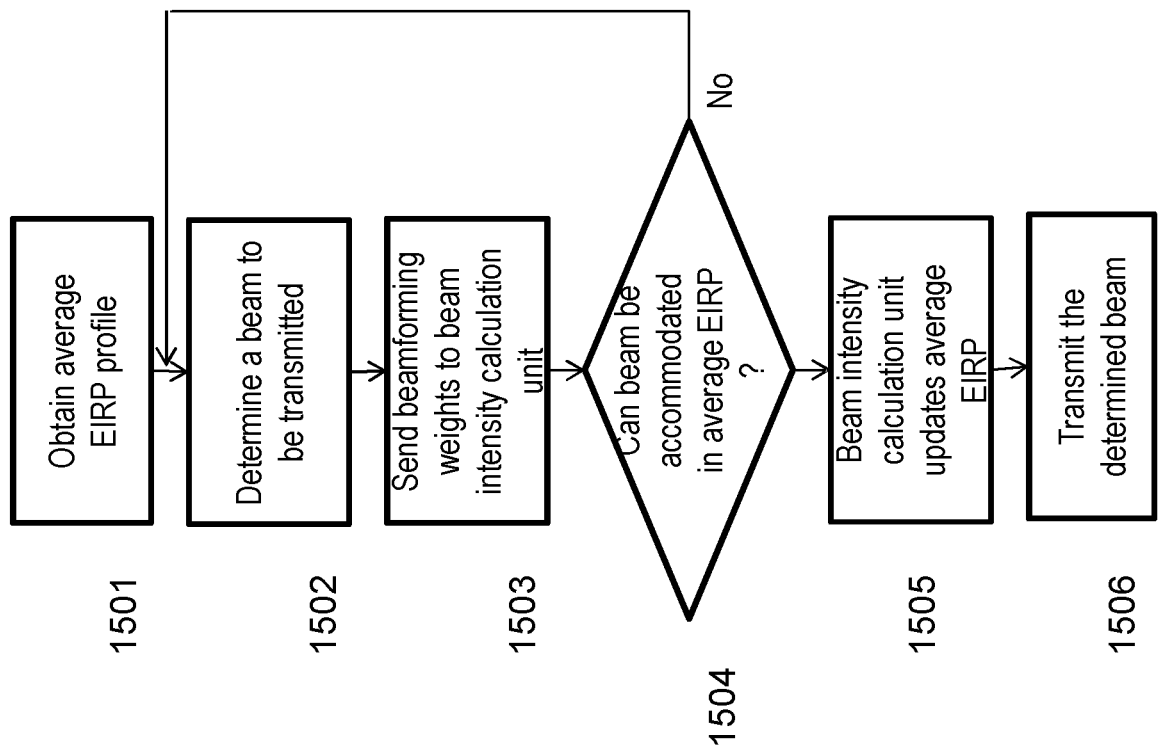
FIG. 15 is a flowchart depicting embodiments of a method in a network node.

The first example embodiment is one in which the time domain averaging is used. In this example, the average spatial profile of radiated power is the average spatial EIRP profile. The procedure for determining the beam and e.g.

scheduling the first UE 121 taking into account average spatial EIRP profile for the first embodiment is outlined in the flowchart of FIG. 15.

Action 1501. As mentioned above in Action 902, the network node 110 obtains an average spatial profile of radiated power in each direction by averaging the established spatial profile of radiated powers in each of the respective directions, averaged over any one or more out of: a frequency interval and a time interval. The network node 110 such as e.g. its scheduler 1301 obtains the average spatial EIRP profile by request the beam intensity calculation unit 1302 to provide the current average spatial EIRP profile. Using the example depicted in FIG. 10, the average spatial EIRP is approaching the EIRP limit for some beam directions, whereas it is low for other beam directions.

Action 1502. The network node 110 such as e.g. its scheduler 1301 determines a beam to be transmitted, such as selects a beam to be transmitted. This may be performed by selecting a subset of UEs such as the first UE 121 for those beam directions in which the average spatial EIRP profile is substantially below a threshold. The threshold may e.g. relates to regulatory EIRP limits. The threshold may be constant or may itself vary depending on spatial direction. Then based on metrics such as a Proportional Fair (PF) metric, CSI, buffer size etc. the network node 110 such as e.g. its scheduler 1301 selects a UE such as the first UE 121 to schedule and a beam direction or set of precoding weights for the scheduled UE. Precoding weights may be generated from a codebook, or by some other means such as reciprocity based beamforming for TDD.

Action 1503. The network node 110 such as e.g. its scheduler 1301 then sends information on the selected beam and precoding weights to the beam intensity calculation unit 1302. The beam intensity calculation unit 1302 estimates a spatial distribution of energy such as the spatial EIRP profile for the suggested beam and temporarily adds this beam intensity pattern, i.e. the spatial EIRP profile into the average spatial EIRP profile.

Action 1504. The network node 110 such as e.g. its beam intensity unit 1302 then verifies that the maximum average spatial EIRP profile will not be exceeded in any direction if the planned beam is transmitted.

Action 1505. As mentioned above, the network node 110 determines a beam to be transmitted to at least the first UE 121, based on the obtained average spatial EIRP profile of radiated power in in each direction, and as long as the average EIRP threshold is not exceeded, the beam intensity unit 1302 indicates to the scheduler 1301 that the beam can be transmitted and permanently updates it's beam intensity profile. The average spatial EIRP profile now includes the estimated radiated power of the beam to be transmitted to the at least first UE 121. In case the average EIRP threshold would be exceeded, then the beam intensity calculation unit 1302 would indicate to the scheduler 1301 that the beam is not suitable and would revert to its previous average spatial EIRP profile and a new beam may be determined in Action 1502.

Action 1506. When the EIRP threshold is not exceeded, network node 110 transmits the determined beam to the first UE 121.

A number of variations may be conceived to the above architecture and procedure. For example, the scheduler 1301 may not receive information about the average spatial EIRP profile at all, and may poll the beam intensity calculation unit 1302 with different types of beam, receiving in each case an indication of whether the beam may be scheduled or not. Alternatively, the scheduler 1301 and beam intensity calculation unit 1302 may be merged such that the scheduler 1301 may consider the average spatial EIRP profile over a longer term whilst planning its beam determining and scheduling decisions.

Figure 17:
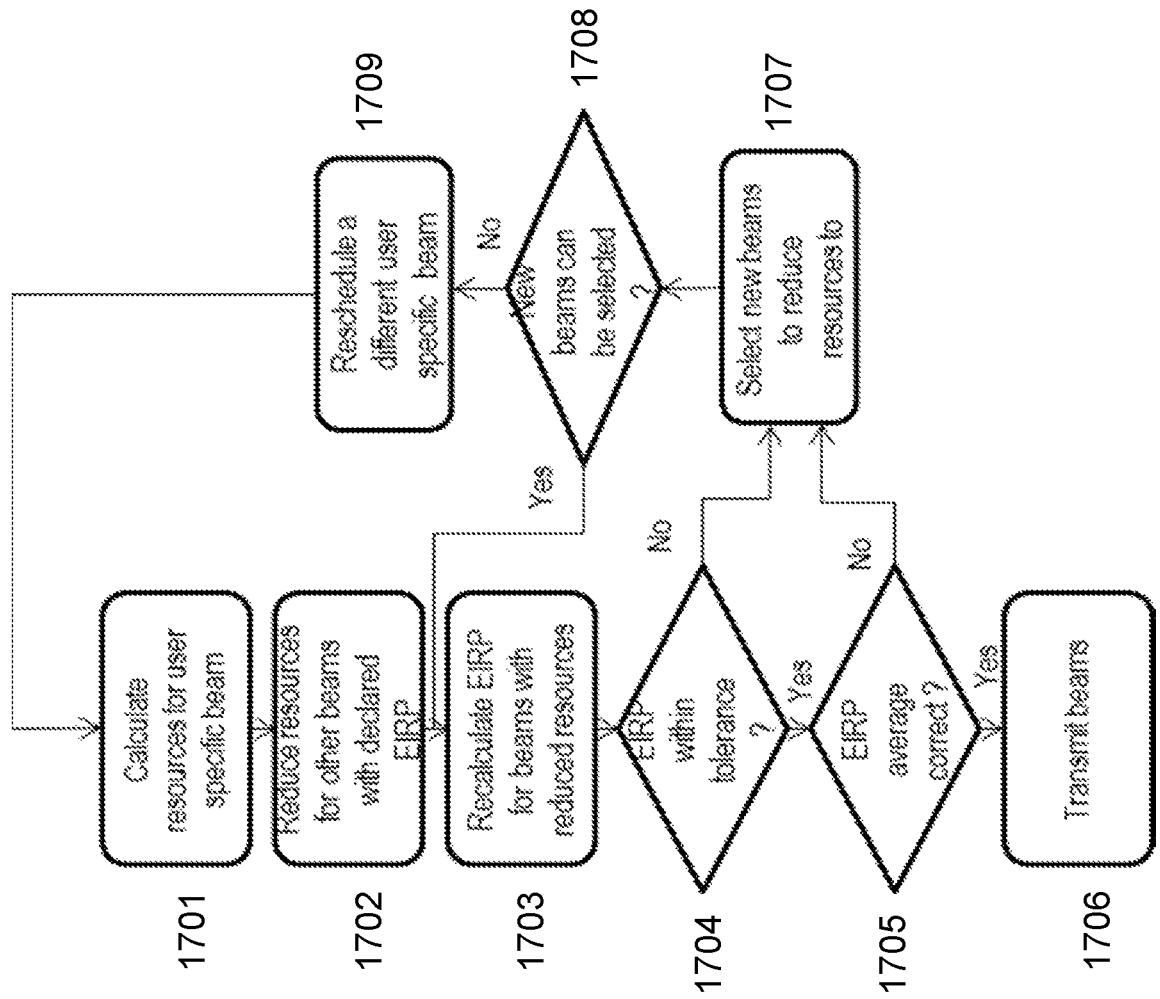
FIG. 17 is a flowchart depicting embodiments of a method in a network node.

In the second example embodiment, the frequency domain is broken up into a number of frequency averaging intervals. The procedure depicted in the flowchart of FIG. 17 is carried out for each of the averaging intervals.

The network node 110 such as e.g. its scheduler 1301 may select 1702 different beams for different resource blocks in each frequency averaging interval. In case the maximum EIRP threshold in a particular direction would be exceeded in a particular frequency averaging interval, then the scheduler may choose to determining and schedule a beam that is directed in an affected direction, i.e. in a direction where the EIRP exceeds the threshold 1504, over fewer resource blocks within the frequency averaging interval, in order to reduce the average spatial EIRP profile in the direction, or may select to schedule a beam directed in the affected direction in a different frequency averaging interval for which the average spatial EIRP profile in the affected direction is lower.

In other embodiments relating to the second purpose, of keeping the average spatial EIRP profile to a declared or prescribed value in certain directions, the aim of the determining of the beam and scheduling may be to maintain the average spatial EIRP profile for certain resource blocks at a certain threshold level and within a tolerance level. Furthermore, the instantaneous EIRP at any individual time and frequency for those resource blocks may be restricted to not deviating from the threshold level by more than e.g. a second acceptable tolerance.

In these embodiments, once UEs such as the first UE 121 are scheduled and the average spatial EIRP profile is calculated by the beam intensity calculation unit 1302, the network node 110 such as e.g. its scheduler 1301 is able to increase and decrease the EIRP between different beams or between different carriers or resource blocks such that the average spatial EIRP profile is maintained in all beam directions, and the instantaneous EIRP of a beam s within a tolerance range of the average. here the instantaneous EIRP is within the tolerance range, not the average.

Figure 16:
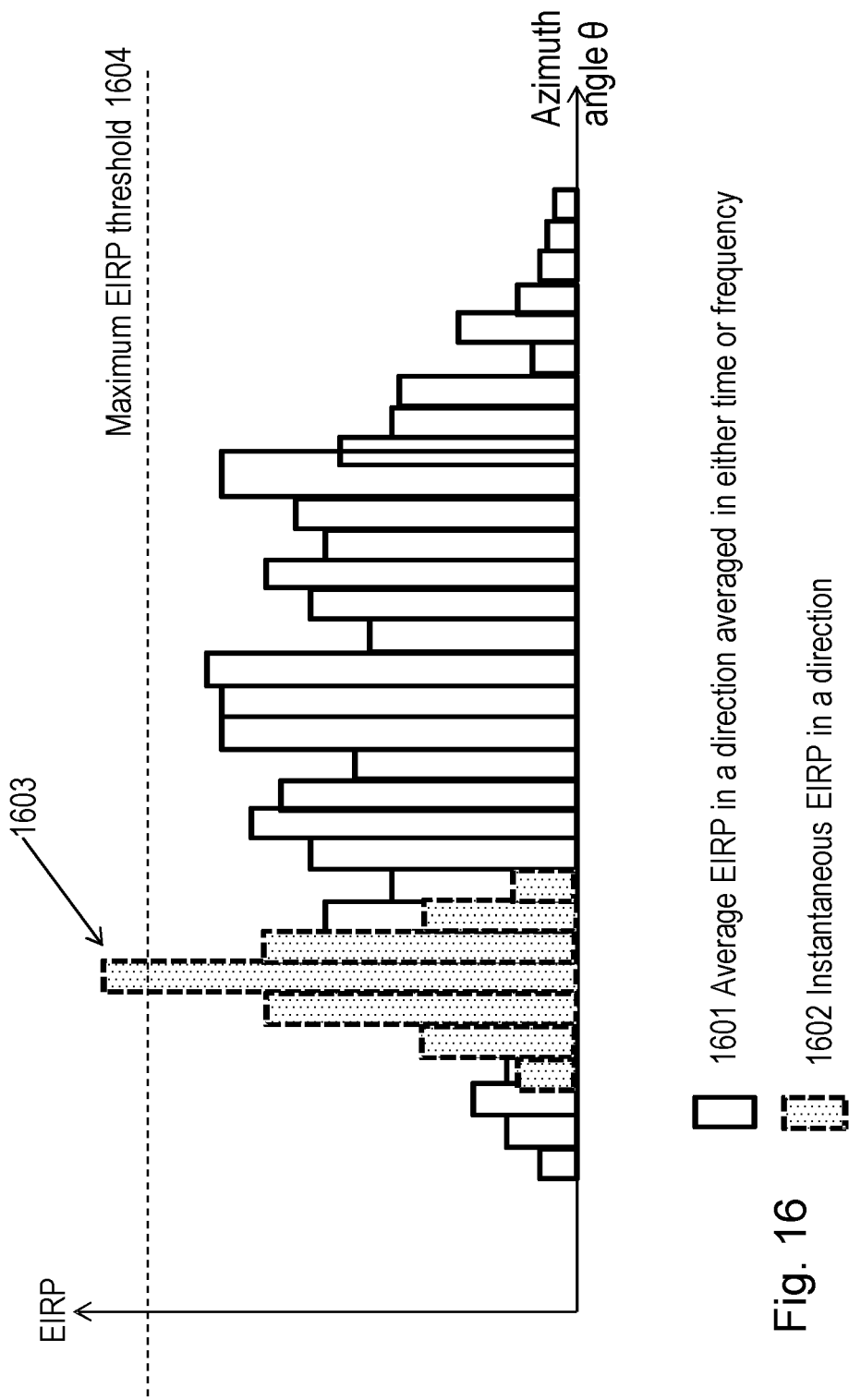
FIG. 16 is a schematic diagram illustrating an example embodiment herein.

FIG. 16 depicts an example of an average spatial EIRP profile 1601 in a direction averaged in either time or frequency, instantaneous EIRP 1602 in a direction. The instantaneous EIRP 1601 exceeds the threshold in a direction 1603, but this is OK because the average does not exceed the threshold 1604.

Figure 18:
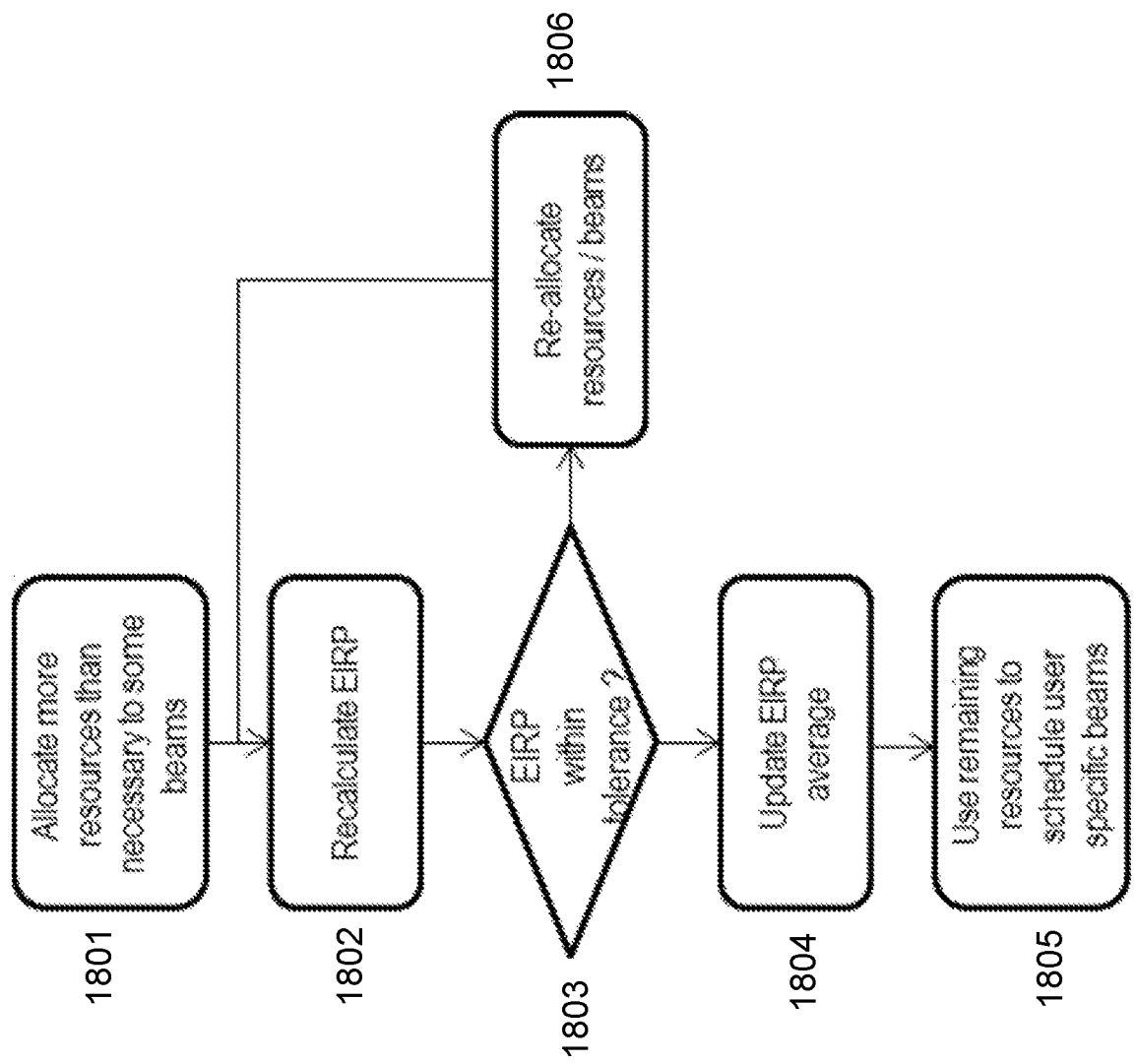
FIG. 18 is a flowchart depicting embodiments of a method in a network node

The procedure for these embodiments is depicted in FIGS. 17 and 18.

The scenario behind the FIGS. 17 and 18 may e.g. be that a manufacturer has declared an average EIRP that is available on cell wide beams transmitted from the base station, carrying for example Common Reference Symbols (CRS), Broadcast Channel (BCH) etc. A cell wide beam is a beam that is intended to be able to be received by a UE such as the first UE 121 that is anywhere within a cell area provided by a network node such as the network node 110. There is some tolerance around the declared average EIRP value. The network node 110 is also able to transmit user specific beams for some UEs.

FIG. 17 depicts a scheduling method allowing additional resources for user specific beams and reduced EIRP for cell specific beams. At certain times, for UEs such as e.g. the first UE 121 with poor coverage the network node 110 needs to achieve a high EIRP for those UEs. At these times, the network node 110 over-allocates (increases) resources to the user specific beam and under allocates (decreases) to the cell specific beams using the procedure of FIG. 17. The network node 110 such as e.g. its scheduler 1501 is aware of data in the buffer for a number of users, as indicated in FIG. 17. FIG. 17 depicts a method for allowing additional resources for user specific beams and reduced EIRP for cell specific beams. The cell specific beam EIRP is re-calculated with fewer resources and the average spatial EIRP profile for the cell wide beam must remain within the tolerance limits.

Action 1701. The network node 110 calculates resources for user specific beam.

Action 1702. The network node 110 reduces resources for other beams with declared EIRP.

Action 1703. The network node 110 then recalculates EIRP for beams with reduced resources.

Action 1704. The network node 110 checks if the EIRP is within the tolerance range of the declared average EIRP level.

Action 1705. When the EIRP is within tolerance range, the network node 110 checks if the EIRP average is correct, i.e. below a threshold.

Action 1706. When the EIRP average is correct, the network node 110 transmits beams.

Action 1707. When the EIRP is not within tolerance, or when the when the EIRP average is not correct the network node 110 selects new beams to reduce resources for.

Action 1708. The network node 110 checks if the new beams can be selected.

When the new beams can be selected, the network node 110 acts according to Action 1703.

Action 1709. When the new beams cannot be selected, the network node 110 reschedules a different user specific beam, and then acts according to Action 1701.

At other times, UEs in good coverage which e.g. may be the first UE 121 are scheduled with user specific beams. At these times, the network node 110 over-allocates resources to the cell specific beams. The reason for over-allocating resources is to keep the average spatial EIRP profile for the cell specific beams at the declared level and within the tolerance limits. After over-allocating resources, the remaining resources are used for the user specific beams. FIG. 18 illustrates a procedure for boosting the EIRP in cell specific beams in order to maintain the average.

Action 1801. The network node 110 over-allocates resources, such as e.g. allocates more resources than needed to some cell specific beams.

Action 1802. The network node 110 recalculates the EIRP for said some cell specific beams.

Action 1803. The network node 110 then checks if EIRP is within tolerance.

Action 1804. When the EIRP is within tolerance, the network node 110 update EIRP average.

Action 1805. The network node 110 then uses remaining resources to schedule user specific beams.

Action 1806. When the EIRP is not within tolerance, the network node 110 re-allocates resources to cell specific beams and then acts according to Action 1802.

Figure 19:
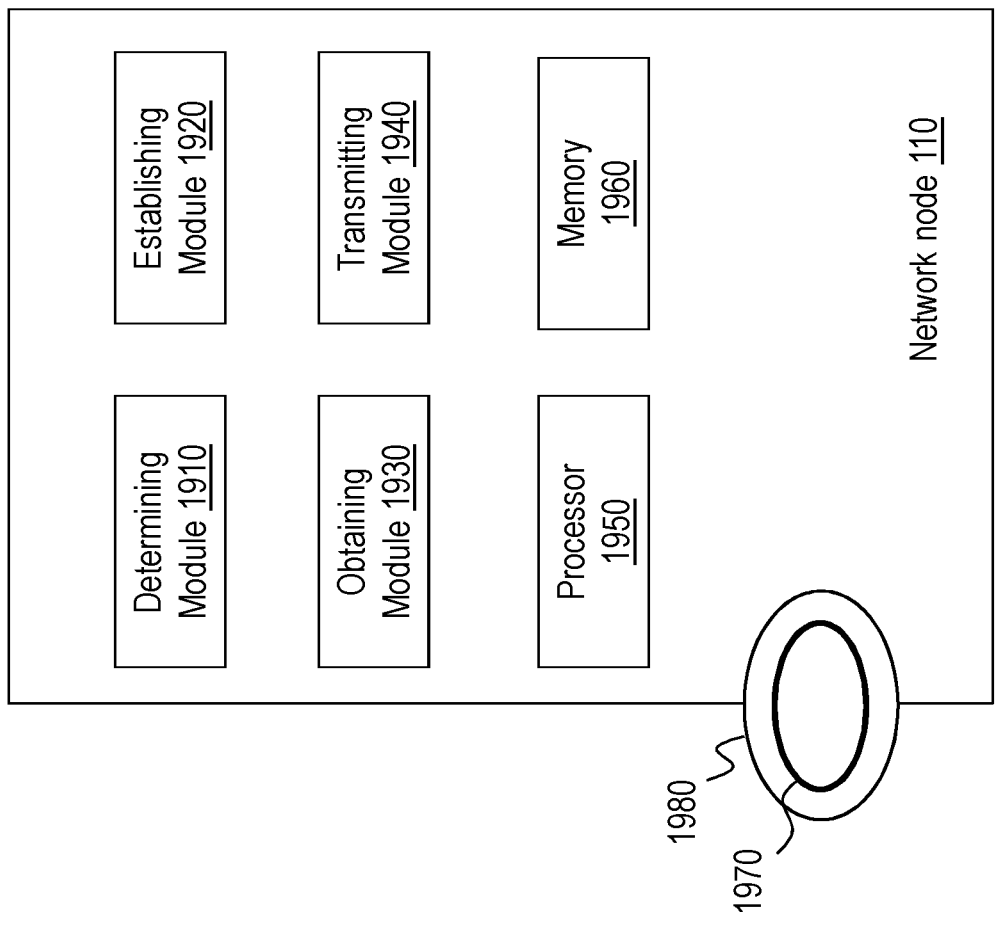
FIG. 19 is a schematic block diagram illustrating embodiments of a network node.

To perform the method actions for determining a beam to be transmitted to at least the first UE, the network node 110 the may comprise the following arrangement depicted in FIG. 19.

The network node 110 is configured to, e.g. by means of a determining module 1910 configured to, determine a beam to be transmitted to at least a first UE 121, based on an obtained average spatial profile of radiated power in each direction, in which the average spatial profile of radiated power is based on an spatial profile of radiated power averaged over any one or more out of a frequency interval and a time interval.

The radiated power in any direction may be represented by an EIRP.

In some embodiments the average spatial profile of radiated power includes the estimated radiated power of the beam to be transmitted to the at least first UE 121. In some of these embodiments the network node 110 may further be configured to, e.g. by means of the determining module 1910 configured to, determine the beam such that the average spatial profile of radiated power does not exceed a threshold. In some other of these embodiments, the network node 110 further is configured to, e.g. by means of the determining module 1910 configured to, determine the beam by adjusting beamforming weights for the beam such that the average spatial profile of radiated power does not exceed a threshold in any direction.

In some alternative embodiments, the average spatial profile of radiated power does not include the estimated radiated power of the determined beam to be transmitted for the at least first UE 121.

The network node 110 may further be configured to, e.g. by means of the determining module 1910 configured to, determine the beam by:

determining the beam to be transmitted in a different frequency, when the average spatial profile of radiated power averaged over a frequency interval exceeds a threshold.

The network node 110 may further be configured to, e.g. by means of the determining module 1910 configured to, determine the beam to be transmitted at a different point in time, when the average spatial profile of radiated power averaged over a time interval exceeds a threshold.

The network node 110 may further be configured to, e.g. by means of the determining module 1910 configured to, determine the beam such that any one or more out of: the average spatial profile of radiated power is within a tolerance range of a declared average spatial profile of radiated power.

The network node 110 may yet further be configured to, e.g. by means of the determining module 1910 configured to, determine the beam to have a radiated power that is any one out of increased and decreased compared to a declared level of available power, as long as the determined beam stays within a tolerance range of the declared spatial profile of radiated power.

The network node 110 may further be configured to, e.g. by means of the determining module 1910 configured to, determine the beam by increasing or decreasing the radiated power in the direction of the beam, such that the average spatial profile of radiated power in the direction of the beam remains within a tolerance range of a declared average spatial profile of radiated power.

In some embodiments, the determined beam is user specific.

The threshold may be represented by a limit for average radiated power.

The network node 110 may further be configured to, e.g. by means of an establishing module 1920 configured to, establish a spatial profile of radiated power in each of different directions from the network node 110, related to beams to be transmitted in each of the respective different directions.

The network node 110 may further be configured to, e.g. by means of an obtaining module 1930 configured to, obtain an average spatial profile of radiated power in each direction by averaging the established spatial profile of radiated power in each of the respective directions, averaged over any one or more out of: a frequency interval and a time interval.

The network node 110 may further be configured to, e.g. by means of a transmitting module 1940 configured to, transmit the determined beam.

The embodiments herein may be implemented through one or more processors, such as a processor 1950 of a processing circuitry in the network node 110 depicted in FIG. 19, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1960 comprising one or more memory units. The memory 460 comprises instructions executable by the processor 1950.

The memory 1960 is arranged to be used to store e.g. information about CSI of a forward link channel, a first quality value, precoders, data, configurations, and applications to perform the methods herein when being executed in the network node 110.

In some embodiments, a computer program 1970 comprises instructions, which when executed by the at least one processor 1950, cause the at least one processor 1950 to perform actions according to any of the Actions 901-904.

In some embodiments, a carrier 1980 comprises the computer program 1970, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first radio node 110, described above may refer to a combination of analog and digital circuits, and/or one or more processors configured with software and/or firmware, e.g. stored in the memory 460, that when executed by the one or more processors such as the processor 450 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

ABBREVIATIONS

| Abbreviation | Explanation |
| --- | --- |
| 2D | Two Dimensional |
| 5G | Fifth Generation |
| AA | Antenna Array |
| AAS | Active Antenna System |
| AE | Antenna Element |
| CQI | Channel Quality Information |
| CSI | Channel State Information |
| CSI-RS | Channel State Information (related Reference Symbols |
| EIRP | Equivalent Isotropic Radiated Power |
| EMF | Electromagnetic Field |
| FCC | Federal Communications Commission |

-continued

| Abbreviation | Explanation |
| --- | --- |
| GHz | Giga Hertz |
| ITU | International Telecommunications Union |
| LTE | Long Term Evolution |
| MIMO | Multiple Input Multiple Output |
| ICNIRP | International Commission on Non-Ionizing Radiation Protection |
| NX | The name of a potential 5G air interface design |
| PF | Proportional Fair |
| QoS | Quality of Service |
| RDN | Radio Distribution Network |
| RX | Receive |
| RXU | Receive Unit |
| SINR | Signal to Interference and Noise Ratio |
| TDD | Time Division Duplex |
| TX | Transmit |
| TXRUA | Transceiver Unit Array |
| TXU | Transmit Unit |
| WRC | World Radio Conference |

The invention claimed is:

1. A method performed by a network node for determining a beam to be transmitted to at least a first User Equipment (UE), the method comprising:
    establishing a spatial profile of a radiated power in each of different directions from the network node, related to beams transmitted in each of the respective different directions, wherein the establishing is based at least on information about geometry of a transmitter array of the network node;
    determining the beam to be transmitted to the at least first UE, based on an obtained average spatial profile of radiated power in each direction,
    wherein the obtained average spatial profile of the radiated power is based on the spatial profile of the radiated power averaged over a frequency interval and a time interval.

2. The method according to claim 1, wherein the radiated power in any direction is represented by an Equivalent Isotropic Radiated Power (EIRP).

3. The method according to claim 1, further comprising:
    obtaining the average spatial profile of the radiated power in said each direction by averaging the established spatial profile of the radiated power in each of the respective directions, averaged over the frequency interval and the time interval.

4. The method according to claim 1, further comprising: transmitting the determined beam to the at least first UE.

5. The method according to claim 1, wherein the average spatial profile of the radiated power includes an estimated radiated power of the determined beam to be transmitted to the at least first UE.

6. The method according to claim 1, wherein the determining of the beam is performed such that at least one of:
    the average spatial profile of the radiated power does not exceed a threshold, wherein the threshold is represented by a limit for average radiated power; or
    the average spatial profile of the radiated power is within a tolerance range of a declared average spatial profile of the radiated power.

7. The method according to claim 1, wherein the average spatial profile of the radiated power does not include an estimated radiated power of the determined beam to be transmitted for the at least first UE.

8. The method according to claim 1, wherein the determining of the beam is performed by:
when the average spatial profile of the radiated power averaged over the frequency interval exceeds a threshold, determining the beam to be transmitted at a different frequency; and
when the average spatial profile of the radiated power averaged over the time interval exceeds the threshold, determining the beam to be transmitted at a different point in time.

9. The method according to claim 1, wherein the determining of the beam comprises at least one of:
adjusting beamforming weights for the beam such that the average spatial profile of the radiated power does not exceed a threshold in any direction;
determining the beam to have a radiated power that is any one out of increased and decreased compared to a declared level of available power, as long as the determined beam stays within a tolerance range of a declared average spatial profile of the radiated power; or
increasing or decreasing the radiated power in a direction of the beam, such that the average spatial profile of the radiated power in the direction of the beam remains within a tolerance range of a declared average spatial profile of the radiated power.

10. A non-transitory computer-readable storage medium on which is stored a computer program comprising instructions, which when executed by at least one processor of a network node, cause the at least one processor of the network node to:
establish a spatial profile of a radiated power in each of different directions from the network node, related to beams to be transmitted in each of the respective different directions, wherein the at least one processor of the network node is caused to establish based at least on information about geometry of a transmitter array of the network node;
determine the beam to be transmitted to at least a first User Equipment (UE), based on an obtained average spatial profile of radiated power in each direction,
wherein the obtained average spatial profile of the radiated power is based on the spatial profile of the radiated power averaged over a frequency interval and a time interval.

11. A network node for determining a beam to be transmitted to at least a first User Equipment (UE), the network node comprising:
processing circuitry configured to:
establish a spatial profile of a radiated power in each of different directions from the network node, related to beams to be transmitted in each of the respective different directions, wherein the network node is configured to establish based at least on information about geometry of a transmitter array of the network node;
determine the beam to be transmitted to the at least first UE, based on an obtained average spatial profile of radiated power in each direction,
wherein the obtained average spatial profile of the radiated power is based on the spatial profile of the radiated power averaged over a frequency interval and a time interval.

12. The network node according to claim 11, wherein the radiated power in any direction is represented by an Equivalent Isotropic Radiated Power (EIRP).

13. The network node according to claim 11, wherein the processing circuitry is further configured to:
obtain the average spatial profile of the radiated power in said each direction by averaging the established spatial profile of the radiated power in each of the respective directions, averaged over a the frequency interval and the time interval.

14. The network node according to claim 11, wherein the processing circuitry is further configured to transmit the determined beam to the at least first UE.

15. The network node according to claim 11, wherein the average spatial profile of the radiated power includes an estimated radiated power of the determined beam to be transmitted to the at least first UE.

16. The network node according to claim 11, wherein the processing circuitry is configured to determine the beam such that at least one of:
the average spatial profile of the radiated power does not exceed a threshold, wherein the threshold is represented by a limit for average radiated power; or
the average spatial profile of the radiated power is within a tolerance range of a declared average spatial profile of the radiated power.

17. The network node according to claim 11, wherein the average spatial profile of the radiated power does not include an estimated radiated power of the determined beam to be transmitted for the at least first UE.

18. The network node according to claim 11, wherein the processing circuitry is configured to determine the beam by:
determining the beam to be transmitted at a different frequency, when the average spatial profile of the radiated power averaged over the frequency interval exceeds a threshold; and
determining the beam to be transmitted at a different point in time, when the average spatial profile of the radiated power averaged over the time interval exceeds the threshold.

19. The network node according to claim 11, wherein the processing circuitry is configured to at least one of:
adjust beamforming weights for the beam such that the average spatial profile of the radiated power does not exceed a threshold in any direction;
determine the beam to have a radiated power that is any one out of increased and decreased compared to a declared level of available power, as long as the determined beam stays within a tolerance range of a declared average spatial profile of the radiated power; or
increase or decrease the radiated power in a direction of the beam, such that the average spatial profile of the radiated power in the direction of the beam remains within a tolerance range of a declared average spatial profile of the radiated power.

20. The network node according to claim 11, wherein the determined beam is user specific.

* * * * *